United States Patent [19]
Oda et al.

[11] Patent Number: 5,569,311
[45] Date of Patent: Oct. 29, 1996

[54] AIR CLEANER

[75] Inventors: Kouichi Oda, Chita; Kazuyuki Horie, Nagoya; Masao Ino, Toyota, all of Japan

[73] Assignees: Toyoda Boshoku Corporation; Nippondenso Co, Ltd., both of Kariya, Japan

[21] Appl. No.: 401,681

[22] Filed: Mar. 10, 1995

[30] Foreign Application Priority Data

Mar. 11, 1994 [JP] Japan .................................. 6-040990

[51] Int. Cl.$^6$ ............................................ B01D 46/00
[52] U.S. Cl. .............................. 55/493; 55/502; 55/503; 55/511; 55/DIG. 28
[58] Field of Search ........................... 55/385.3, 493, 55/495, 497, 500, 502, 503, 504, 511, DIG. 28

[56] References Cited

U.S. PATENT DOCUMENTS

| | | | |
|---|---|---|---|
| 4,440,555 | 4/1984 | Chichester | 55/493 |
| 4,725,296 | 2/1988 | Kurotobi | 55/502 |
| 4,925,469 | 5/1990 | Clement et al. | 55/502 |
| 5,292,432 | 3/1994 | Jainek et al. | 55/511 |
| 5,391,212 | 2/1995 | Ernst et al. | 55/502 |

FOREIGN PATENT DOCUMENTS 3-20532   5/1991   Japan .
4-79958   7/1992   Japan .

*Primary Examiner*—C. Scott Bushey
*Attorney, Agent, or Firm*—Cushman Darby & Cushman, L.L.P.

[57] ABSTRACT

An air cleaner for use in an intake air passage connected to an engine of a vehicle, including a housing separable into two housings, a filter element received in one of the two housings, a sealing member for sealing contact with a sealing surface of the other housing, and a hinge device for rotatably connecting the two housings to each other, the hinge device including a receiving member having a receiving opening, and an axis member for being received in the receiving member through the receiving opening, the axis and receiving members being displaceable relative to each other substantially along a plane in which the sealing member extends, the air cleaner further including a clamp device cooperating with the hinge device to secure the two housings to each other, and a protector including two abutting portions, the protector allowing the sealing surface and the sealing member to be brought into the sealing contact with each other when the axis member is positioned at a hinging position in the receiving member, and inhibiting the sealing surface and the sealing member from being brought into the sealing contact with each other, by abutment of the two abutting portions thereof, when the axis member is not positioned at the hinging position, the protector including, as the two abutting portions thereof, a portion of one of the two housings and a portion of the other housing, respectively.

20 Claims, 17 Drawing Sheets

AIR CLEANER

BACKGROUND OF THE INVENTION

1. Field of the Invention

The present invention relates to the improvements of an air-cleaning apparatus or air cleaner.

2. Discussion of the Prior Art

There is known an air cleaner for a motor vehicle, which is assembled using two housings together with a filter element to be accommodated in the housings. One example of this type of air cleaner is disclosed in Laid-Open Publication No. 4-79958 of Unexamined Japanese Utility Model Application. The prior air cleaner includes: (a) a first housing having an air inlet and a first opening; (b) a second housing having a second opening, a sealing surface surrounding the second opening, and an air outlet; (c) a filter element having a sealing member which is attached to the outer periphery of the filter element and which is interposed between the first and second housings when the two housings are assembled together. The first housing has (d) a first engaging portion located outwardly of the first opening. The second housing has (e) a second engaging portion which is located outwardly of the sealing surface and which is engageable with the first engaging portion when the two engaging portions are displaced relative to each other in a direction substantially parallel to the plane in which the sealing member extends. The second engaging portion defines the distance between the first and second housings assembled together, as measured in a direction substantially perpendicular to the plane of the first opening. The air cleaner further includes (f) a clamp device for clamping corresponding portions of the first and second housings remote from the first and second engaging portions, so that the two housings are secured to each other. The clamp device cooperates with the first and second engaging portions engaged with each other, to cause the sealing surface of the second housing to come into sealing contact with the sealing member accommodated in the first housing.

Thus, the above-described air cleaner is assembled by engaging the first and second engaging portions with each other on one of opposite side surfaces of the air cleaner and clamping the first and second housings together on the other side surface with the clamp device. In this arrangement, it is not necessary to provide another clamp device on the above-indicated one side surface, since the first and second housings are connected to each other by the engagement of the first and second engaging portions. Thus, the prior air cleaner may be manufactured at lower cost as compared with an air cleaner wherein a first and a second housing are assembled together by using a clamp device on each of opposite side surfaces of the air cleaner. Moreover, the prior arrangement facilitates opening and closing of the first and second housings, thereby making it easier to clean or replace the filter element accommodated therein.

In the above air cleaner, the sealing surface of the second housing is held in sealing contact with the sealing member attached to the filter element, for the purpose of preventing dust from being mixed with air flowing through the air cleaner. To this end, however, it is not essential to interpose the sealing member between the first and second housings as taught by the above-identified document, but it is possible that the first housing support the sealing member by limiting the depth of occupation of the sealing member into the first housing. In the latter case, it is also required that the sealing surface of the second housing be held in sealing contact with the sealing member of the filter element when the second housing closes the first housing.

FIG. 21 shows a manner in which the above air cleaner is assembled. Specifically described, a worker moves a second housing 206 relative to a first housing 202 in a direction indicated at an arrow, so that a second engaging portion 200 of the second housing 206 is displaced in a rightward direction in FIG. 21 so as to engage a first engaging portion 204 of the first housing 202. Since the second housing 206 is displaced in a direction from inside, toward outside, of the first housing 202, an outer edge 210 of a sealing surface 208 of the second housing 206 may interfere with a sealing member 212 accommodated in the first housing 202 and may even peel the sealing member 212 off the filter element, thereby causing elastic deformation of the sealing member 212 as illustrated in the figure. Thus, the prior air cleaner is not assured of satisfactory air-tight sealing between the first and second housings 202, 206, due to the elastic deformation of the sealing member 212 that remains after the two housings 202, 206 are assembled together.

SUMMARY OF THE INVENTION

It is therefore an object of the present invention to provide an air cleaner having a separable housing separable into a first and a second housing, and a filter element accommodated in the separable housing, wherein the first and second housings are assembled together such that a sealing member associated with the filter element does not suffer from the problem of elastic deformation that leads to poor sealing between the first and second housings of the air cleaner as an end product.

The above object has been achieved by the present invention, which provides an air cleaner for cleaning air flowing through an air passage, comprising: a separable housing including a first and a second housing for communicating with an upstream and a downstream portion of the air passage, respectively, the first and second housings having a first and a second opening, respectively; a filter element accommodated in the separable housing; one of the first and second housings having a sealing surface surrounding a corresponding one of the first and second openings; a sealing member for sealing contact with the sealing surface; a hinge device located outwardly of the first and second openings of the first and second housings, for rotatably connecting the first and second housings to each other, the hinge device including a receiving member having a receiving opening, and an axis member for being received in the receiving member through the receiving opening, the axis member and the receiving member being displaceable relative to each other substantially along a plane in which the sealing member extends; a clamp device cooperating with the hinge device to secure the first and second housings to each other; and a protector including a first and a second abutting portion, the protector allowing the sealing surface and the sealing member to be brought into the sealing contact with each other when the axis member of the hinge device is positioned at a prescribed hinging position in the receiving member of the hinge device, and inhibiting the sealing surface and the sealing member from being brought into the sealing contact with each other, by abutment of the first and second abutting portions thereof, when the axis member is not positioned at the hinging position, the protector including, as the first and second abutting portions thereof, a portion of the first housing and a portion of the second housing, respectively. The filter element may be accommodated in the separable housing in various manners.

For example, the outer-peripheral portion of the filter may be strengthened or reinforced using a strengthening means or a reinforcing member, so that the first or second housing supports the strengthened or reinforced portion of the filter. Alternatively, the sealing member may be attached to the outer-peripheral portion of the filter, so that the first or second housing supports the sealing member. In the latter case, the sealing member may be sandwiched between the first and second housings. Both the first and second manners may be employed in a single air cleaner. In the second manner in which the sealing member is sandwiched between the first and second housings, it is preferred in view of the maintenance of the sealing tightness to form a first and a second sealing surface surrounding the first and second openings of the first and second housings, respectively, and sandwich the sealing member between the first and second sealing surfaces.

In the air cleaner constructed as described above, the first and second abutable portions of the protector enable a worker or a robot to move the first and second housings relative to each other so that the axis member of the hinge device is positioned at the hinging position in the receiving member of the hinge device. During this operation, the protector effectively prevents the outer or inner edge of the sealing surface from interfering with the sealing member which may be attached to the filter element accommodated in the first or second housing, in particular, prevents such interference which results in elastically deforming the sealing member to an extent that the sealing member cannot provide satisfactory sealing function. Thus, the worker can easily assemble the two housings together, depending upon the abutable portions of the protector only, without causing the problem of elastic deformation of the sealing member. When the axis member is positioned at the hinging position, there remains no longer any possibility that the sealing surface interfere with the sealing member, and therefore the protector allows the worker to bring the sealing surface and the sealing member into proper sealing contact with each other. Thereafter, the two housings may be secured to each other by the clamp device, so that the clamp device cooperates with the hinge device to hold the sealing member in the satisfactory sealing contact with the sealing surface. Thus, the first and second housings can be assembled together without damaging the sealing function of the sealing member.

In a preferred embodiment of the present invention, the protector includes, as the first and second abutting portions thereof, a first guide portion and a second guide portion each adjacent to the hinge device, respectively, and additionally includes, as the first and second abutting portions thereof, a third guide portion and a fourth guide portion each remote from the hinge device toward to the clamp device, respectively, the first, second, third, and fourth guide portions having a first, a second, a third, and a fourth shape, respectively, which allow the axis member of the hinge device to be displaced relative to the receiving member of the hinge device toward the hinging position in the receiving member while inhibiting the sealing surface from interfering with the sealing member, elastically deforming the sealing member, and making the sealing contact unsatisfactory, and to allow the sealing surface and the sealing member to be brought into the sealing contact with each other when the axis member is positioned at the hinging position. In this embodiment, the axis member and receiving member of the hinge device may be displaced relative to each other, either in a first manner that one of the axis and receiving members is moved relative to the other member in an outward direction from inside, toward outside, of the separable housing, as disclosed in the above-identified document, or in a second manner that one of the axis and receiving members is moved relative to the other member in an inward direction from outside, toward inside, of the separable housing. The sealing member may include a sealing lip protruding in the outward direction from inside, toward outside, of the separable housing, the outward direction having an angle with respect to the plane in which the sealing member extends, the sealing lip providing the sealing contact with the sealing surface. In the latter case, the tip of the sealing lip is free apart from the remaining portion of the sealing member before the sealing member is held in the sealing contact with the sealing surface. Even if the axis and receiving members of the hinge device may be displaced relative to each other in the above-explained second manner, the protector effectively protects the sealing lip against the inner edge of the sealing surface being moved relative to the sealing member. After the axis member of the hinge device has been positioned at the hinging position in the receiving member of the hinge device and the first and second housings have been secured to each other by the clamp device, the first and second guide portions, and/or third and fourth guide portions, of the protector may either remain in engagement with each other or be separated from each other. The manner of engagement of the first and second guide portions or the third and fourth guide portions may not be limited to a specific manner. However, it is preferred that at least one of (a) the first and second guide portions and (b) the third and fourth guide portions remain in engagement with each other with the first and second housings being clamped to each other with the clamp device, so that the two housings are prevented from moving out of position relative to each other in any direction along the "sealing" plane in which the sealing member extends. Thus, the stability of operation of the air cleaner is much improved. The direction in which the two housings are prevented from moving out of position may be limited to a specific direction or directions parallel to the sealing plane. For example, the third and fourth guide portions may have the third and fourth shapes which ensure that the two guide portions remain in engagement with each other with the two housings being clamped to each other, so that the two housings are prevented from moving out of position in at least one of the forward and backward directions in which the axis member of the hinge device is displaced relative to the receiving member of the hinge device. The hinge device connects the first and second housings such that the two housings are rotatable relative to each other about an axis line substantially corresponding to the axis member of the hinge device positioned at the hinging position.

In another preferred embodiment of the present invention, the protector includes, as the first and second abutting portions thereof, a first interfering portion and a second interfering portion, respectively, the first and second interfering portions interfering with each other to inhibit the axis member of the hinge device from being positioned at the hinging position in the receiving member of the hinge device, when the first and second housings are placed relative to each other within an angular-position range whose first limit corresponds to a first angular position at which the sealing surface and the sealing member are held in the sealing contact with each other and whose second limit corresponds to a second angular position at which the sealing surface and the sealing member are separated from each other, the first and second interfering portions allowing the sealing surface and the sealing member to be brought into the sealing contact with each other when the axis member is positioned at the hinging position. The axis member of the hinge device can be positioned at the hinging position in the receiving member of the hinge device, only when the first and second housings are not placed relative to each other within the angular- position range and, when the two housings are not placed within the angular-position range, there is no possibility that the sealing surface interferes with the sealing member, thereby elastically deforming the sealing member. When the two housings are rotated about the axis member positioned at the hinging position, the sealing surface is moved relative to the sealing member in a composite direction of a first direction perpendicular to the sealing surface in which the sealing member extends and a second direction from inside, toward outside, of the separable housing or air cleaner. Therefore, the sealing surface does not peel the sealing member off the filter element.

In yet another preferred embodiment of the present invention, the protector includes, as the first and second abutting portions thereof, a first protrusion and a second protrusion each adjacent to the hinge device, respectively, the first protrusion extending in a direction substantially perpendicular to a plane of the first opening of the first housing, the second protrusion extending in a direction substantially perpendicular to a plane of the second opening of the second housing, the first and second protrusions abutting on each other to inhibit the sealing surface and the sealing member from being brought into the sealing contact with each other when the axis member of the hinge device is displaced relative to the receiving member of the hinge device toward the hinging position in the receiving position, the first and second protrusions allowing the sealing surface and the sealing member to be brought into the sealing contact with each other when the axis member is positioned at the hinging position. The first and second protrusions can abut on each other before the sealing surface and the sealing member interfere with each other, when the axis member of the hinge device is displaced relative to the receiving member of the same and even when the sealing surface and the sealing member are moved to approach each other. Consequently, the sealing surface and the sealing member are kept away from each other in the direction substantially perpendicular to the plane of the first or second opening of the first or second housing, and are prevented from interfering with each other. If the two housings are properly moved relative to each other, however, the first and second protrusions may not abut on each other. After the two protrusions have passed by each other, the axis member has been positioned at the hinging position in the receiving member, and the two housings are clamped to each other with the clamp device, the sealing surface and the sealing member are held in the satisfactory sealing contact with each other. Thus, the assembling of the air cleaner is finished.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
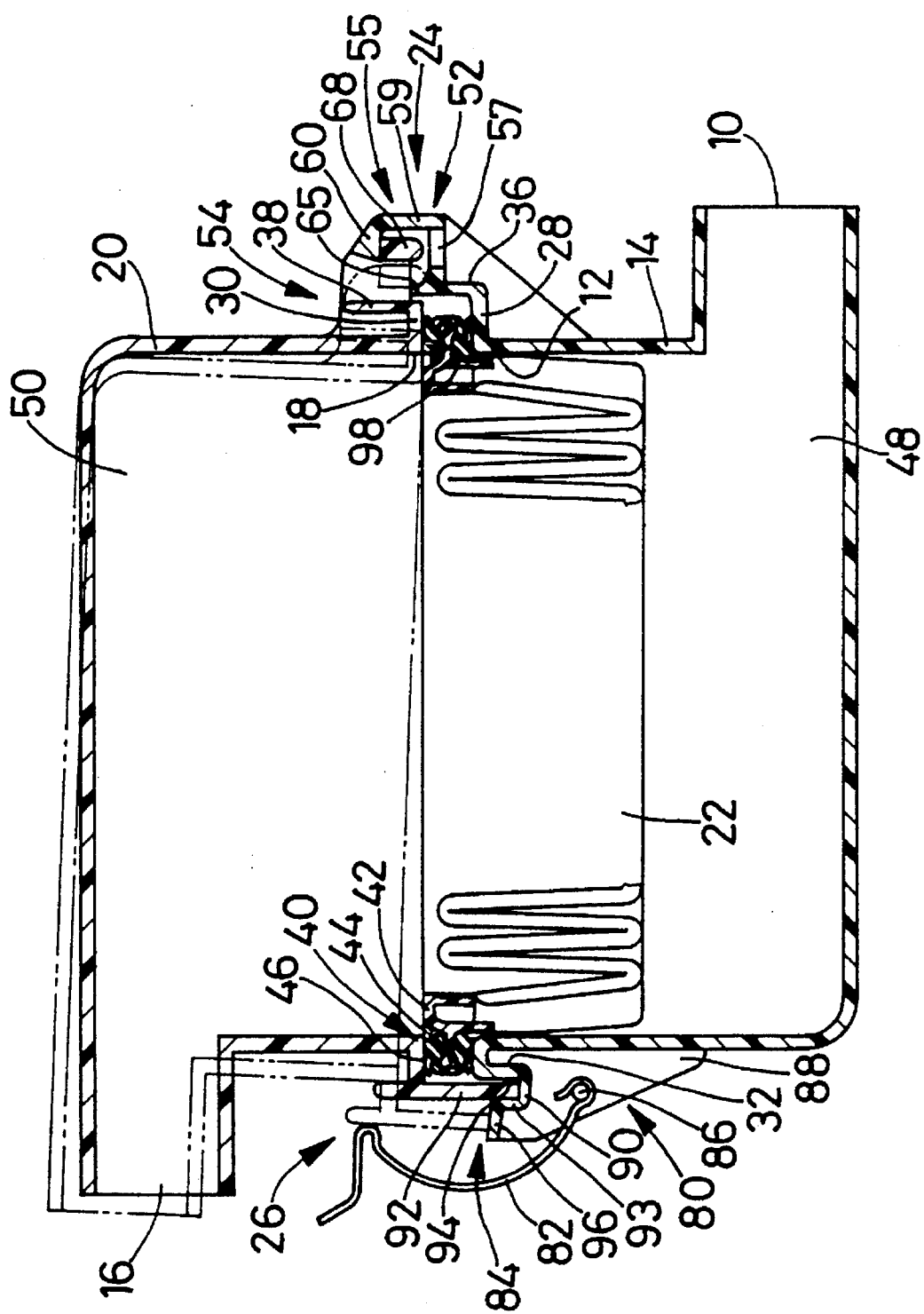
FIG. 1 is a front elevation view in cross section of an air cleaner according to a first embodiment of the present invention.

Referring first to FIG. 1, there is shown an air cleaner apparatus for use in an intake air passage connected to an engine of a motor vehicle. The air cleaner includes: a case or first housing 14 having an air inlet 10 and an opening (first opening) 12; a cap or second housing 20 having an air outlet 16 and an opening (second opening) 18; a filter element 22 accommodated in the case 14; a pair of hinge devices 24 provided on one of opposite side surfaces of the air cleaner (right side surface as seen in FIG. 1); and a pair of clamping devices 26 provided on the other side surface of the air cleaner (left side surface as seen in FIG. 1).

In the following description and the attached drawings, a direction from a center of the air cleaner toward the case 14 is referred to as a "downward direction" while a direction from the center of the air cleaner toward the cap 20 is referred to as an "upward direction". Further, a direction from the center of the air cleaner toward each of the right and left side surfaces of the air cleaner is referred to as an "outward direction", while a direction from each of the right and left side surfaces toward the center of the air cleaner is referred to as an "inward direction".

The case 14 has a flange (first flange) 28 formed throughout the entire periphery of the first opening 12 while the cap 20 has a flange (second flange) 30 formed throughout the entire periphery of the second opening 18. The first and second flanges 28, 30 are opposed with each other when the case 14 and the cap 20 are assembled together.

Figure 2:
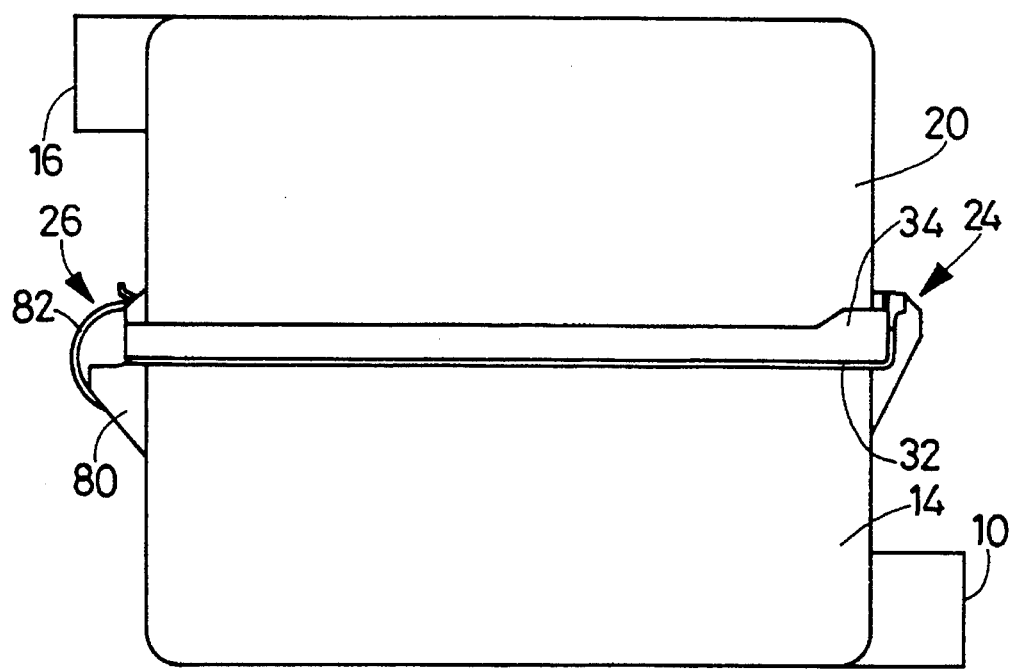
FIG. 2 is a front elevation view of the air cleaner of FIG. 1.
Figure 3:
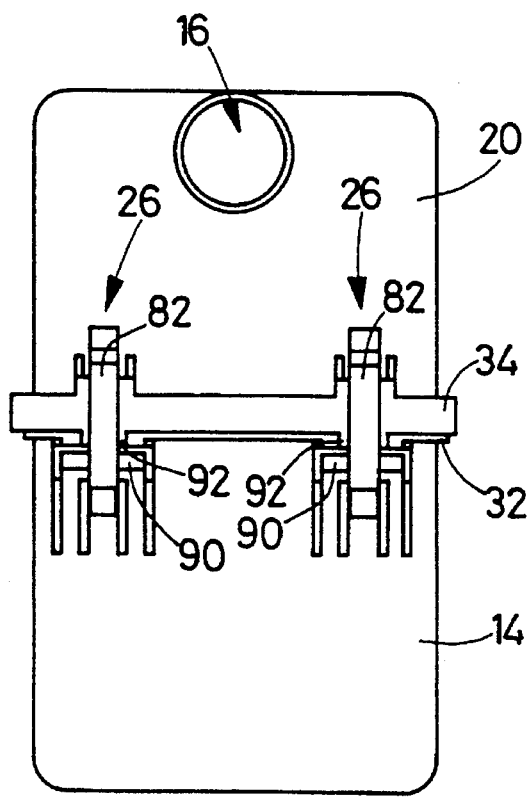
FIG. 3 is a left-hand side elevation view of the air cleaner of FIG. 1.

The first flange 28 has a downward-extending portion 32 which extends downward from the edge of the first flange 28 as shown in FIG. 1 while the second flange 30 has an outer wall 34 which extends downward and covers the downward-extending portion 32 of the first flange 28 as shown in FIGS. 2 and 3. The downward-extending portion 32 and the outer wall 34 are not formed on the right side surface of the air cleaner where the hinge devices 24 are provided. In place of the downward-extending portion 32 and the outer wall 34, the first and the second flanges 28, 30 respectively have an outer wall 36 and an upward-extending portion 38 both of which extend upward, on the above-indicated right side surface of the air cleaner. The downward-extending portion 32 is contiguous with the outer wall 36 while the outer wall 34 is contiguous with the upward-extending portion 38. When the case 14 and the cap 20 are assembled together, the outer wall 34 engages the downward-extending portion 32 such that the outer wall 34 fits on the outer surface of the downward-extending portion 32, thereby to prevent the movement of the cap 20 relative to the case 14 after they are assembled together to provide the integral structure of the air cleaner. Described in detail, the engagement of the outer wall 34 with the downward-extending portion 32 prevents the movement of the cap 20 relative to the case 14 in the rightward direction as seen in FIGS. 1 and 2 as well as the movement of the cap 20 relative to the case 14 in the rightward and leftward directions as seen in FIG. 3. The movement of the cap 20 relative to the case 14 in the leftward direction as seen in FIGS. 1 and 2 is inhibited by the clamping device 26. The operation of the clamping device 26 for preventing the leftward movement of the cap 20 will be described.

Figure 4:
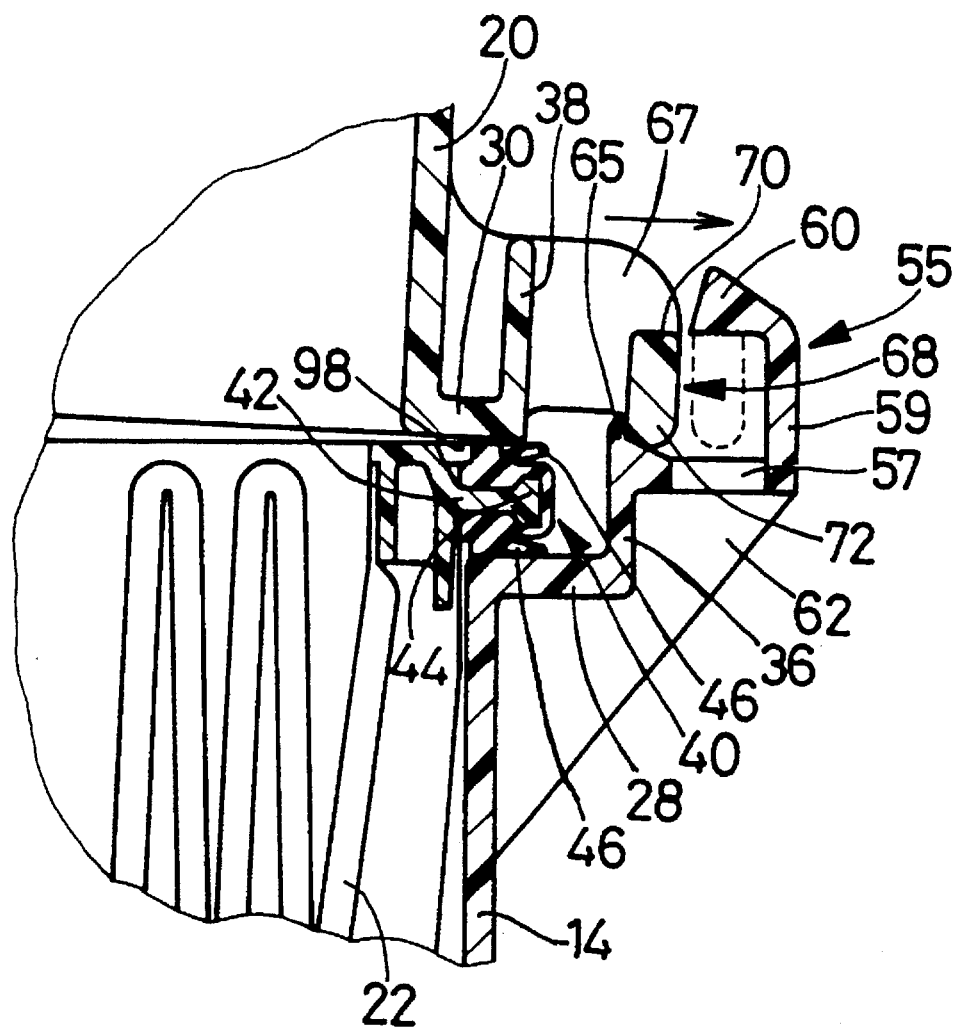
FIG. 4 is a cross sectional view showing an upper component and a lower component of a hinge device used in the air cleaner of FIG. 1.

In the air cleaner constructed according to the present invention, a seal member 40 is provided on and throughout the entire periphery of the first flange 28 of the case 14. With the case 14 and the cap 20 assembled together, the seal member 40 is interposed between the first flange 28 of the case 14 and the second flange 30 of the cap 20. As shown in FIG. 4, the seal member 40 has a generally U-shaped cross sectional shape and has a pair of seal lips 46, 46 formed on opposite side walls thereof. Each of the seal lips 46 extends toward the bottom wall of the U-shaped seal member 40 such that each seal lip 46 is gradually spaced away from the corresponding side wall. Within a recess of the U-shaped seal member 40, there is inserted an outward-extending flange 44 of a seat holder 42 which is fixed to an outer periphery of the filter element 22. Thus, the seal member 40 tightly seals a clearance defined by the first flange 28 of the case 14 and the second flange 30 of the cap 20 while supporting the filter element 22 within the case 14.

The seal member 40 functions to inhibit an air flow which flows from a cavity 48 defined by the case 14 and the filter element 22 toward a cavity 50 defined by the cap 20 and the filter element 22 without passing through the filter element 22. The seal member 40 further prevents the ambient air from flowing into the cavity 50 from the outside of the air cleaner.

Figure 5:
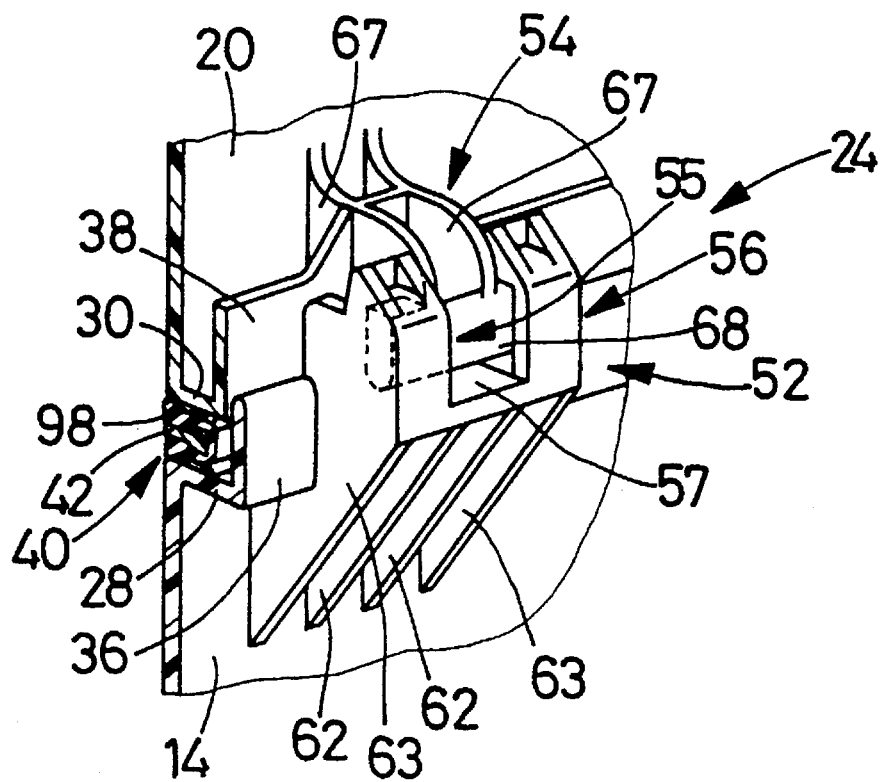
FIG. 5 is a perspective view of the hinge device of FIG. 4, wherein the upper and lower components are engaged with each other.
Figure 6:
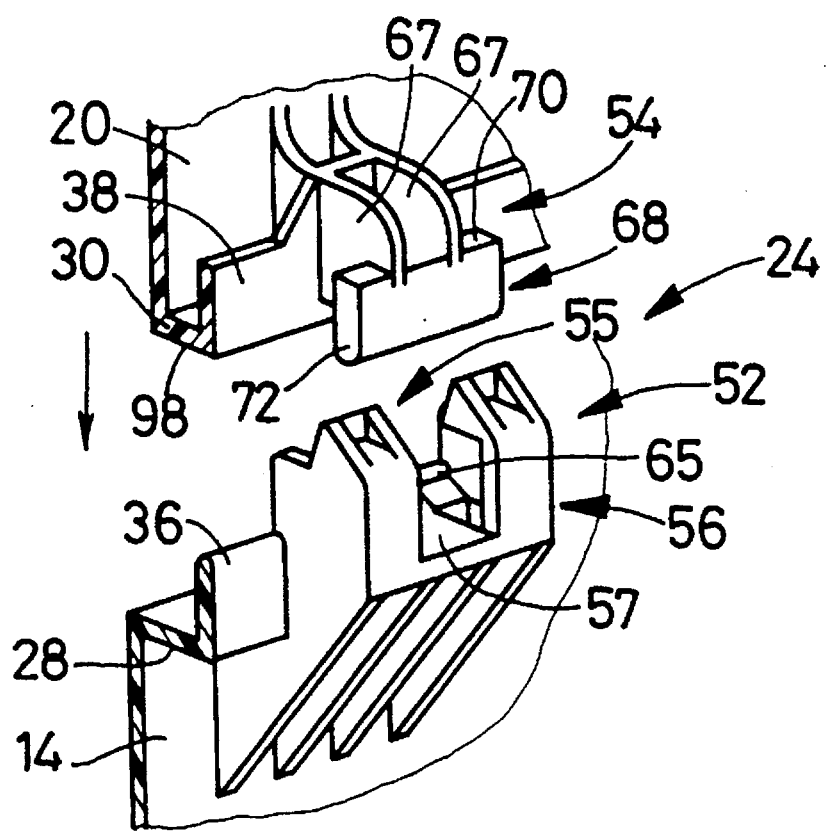
FIG. 6 is a perspective view showing the upper and lower components of the hinge device of FIG. 4 before they are engaged with each other, wherein the upper component is to be moved in a vertical direction relative to the lower component.
Figure 7:
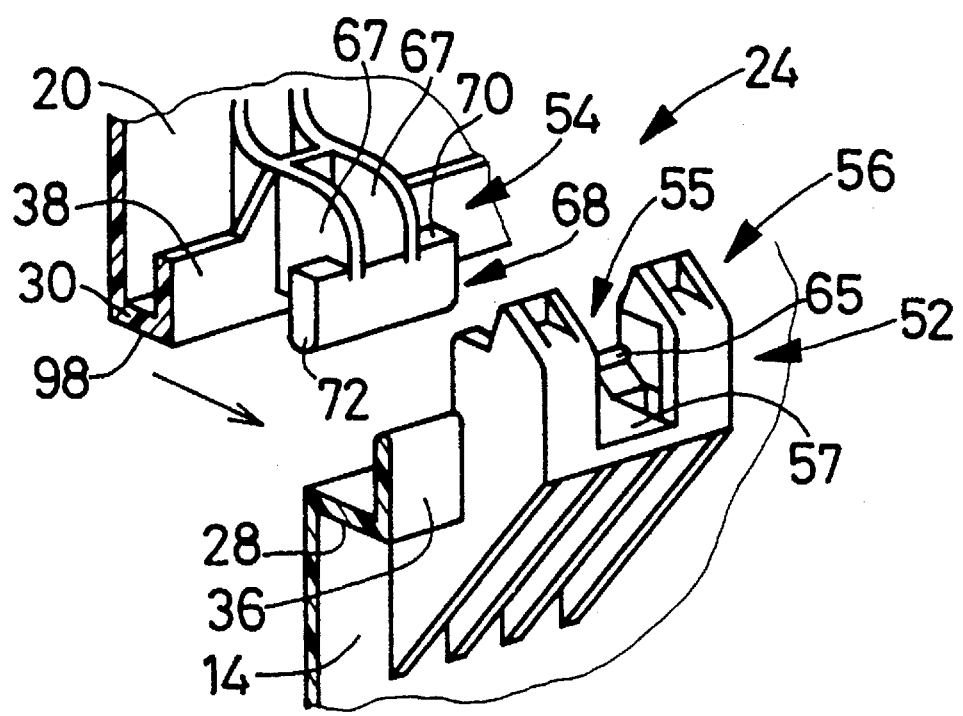
FIG. 7 is a perspective view showing the upper and lower components of the hinge device of FIG. 4 before they are engaged with each other, wherein the upper component is to be moved in a horizontal direction relative to the lower component.

Referring next to FIGS. 5–7, there will be described the hinge devices 24 which are provided on the right side surface of the air cleaner as seen in FIG. 1. Each of the hinge devices 24 consists of a lower component 52 formed on the outer wall 36 of the case 14 and an upper component 54 formed on the upward-extending portion 38 of the cap 20. The lower and upper components 52, 54 engage with each other in a manner which will be described in detail, thereby to provide a hinge device 24. In this embodiment, two pairs of the lower components 52 and the upper components 54 are formed on the right side surface of the air cleaner in a spaced apart relation with each other in a longitudinal direction of the outer wall 36. The lower and upper components 52, 54 of each pair are held in engagement with each other, thereby to provide a hinge device 24.

The lower component 52 includes a pair of receiving members or receptacles 55, 56 which are spaced apart from each other by a suitable distance in the longitudinal direction of the outer wall 36, and a guide portion 57 formed between the pair of the receptacles 55, 56. The receptacles 55, 56 are identical in construction with each other and are formed symmetrically with respect to the guide portion 57. In this respect, only the receptacle 55 will be described in detail, and detailed description of the receptacle 56 is omitted. The same reference numerals as used for the receptacle 55 are assigned to the corresponding portions of the receptacle 56. As shown in FIG. 4, the receptacle 55 consists of: an upright portion serving as a back wall 59 which is formed upward of, and in parallel with, the outer wall 36 and which extends in the upward direction perpendicular to a plane of the guide portion 57; and an inward-extending portion serving as an engaging portion 60 which extends inward at a top end of the back wall 59. The receptacle 55 is supported on and connected to the side wall of the case 14 via a pair of ribs 62, 63. As apparent from FIGS. 5–7, the rib 63 functions as a side wall of the receptacle 55.

The lower component 52 of the hinge device 24 is made of a synthetic resin, and is formed integrally with the case 14. However, since the guide portion 57 is so formed as to provide a space between the pair of receptacles 55, 56 and each receptacle 55, 56 is so formed as to be open downward, as clearly shown in FIG. 6, the case 14 and the lower component 52 which have been integrally formed in a mold is easily removed from the mold.

The outer wall 36 is provided with a pair of projections 65 corresponding to the pair of receptacles 55, 56, which projections 65 project a suitable amount from the top end of the outer wall 36. As shown in FIG. 4, each projection 65 is located inward by a suitable distance from the inner edge of the engaging portion 60.

The upper component 54 of the hinge device 24 includes a pair of arms 67, 67 extending outward from the plane of the upward-extending portion 38 of the cap 20, and an axis member of shaft 68 secured to the ends of the pair of arms 67, 67. An external dimension of the pair of arms 67, 67, that is a distance between the pair of arms 67, 67 as measured in the longitudinal direction of the upward-extending portion 38 is slightly smaller than an internal dimension defined by and between the two receptacles 55, 56, and therefore, the pair of arms 67, 67 can be inserted into a clearance between the pair of receptacles 55, 56.

The shaft 68 secured to the ends of the pair of arms 67, 67 has a width dimension larger than the external dimension of the arms 67 and smaller than an internal dimension of the pair of ribs 63, 63. The height of the shaft 68 is smaller than a distance between the inner surfaces of the engaging portions 60 and the plane of the guide portion 57 and is also smaller than a distance between the projections 65 and the inner surfaces of the back walls 59. Accordingly, the shaft 68 is rotatably received within a cutout serving as a bearing portion defined by the pair of receptacles 55, 56, guide portion 57 and projections 65.

The shaft 68 has a thickness dimension smaller than a distance between the inner edges of the engaging portions 60 and the projections 65 as measured in a direction parallel with the plane of the guide portion 57. Accordingly, the shaft 68 can be inserted into, and removed from, a clearance defined by the edges of the engaging portions 60 and the projections 65, in a vertical direction with respect to the plane of the guide portion 57.

The shaft 68 has end portions 70, 70 for being held in engagement with the corresponding engaging portions 60, 60 of the receptacles 55, 56. The shaft 68 further has a protruding portion 72 which can abut on the projections 65 of the lower component 52.

There will be next described a pair of the clamping devices 26, 26 formed on the left side surface of the air cleaner as seen in FIG. 1. Each of the clamping devices 26, 26 includes a spring seat member 80, a semicircular spring 82, and a clearance regulating device 84 which is provided for the purpose of suitably controlling the clearance between the first flange 28 of the case 14 and the second flange 30 of the cap 20.

More specifically described, the spring seat member 80 formed integrally with the side wall of the case 14 has a pin 86 which pivotably supports the semicircular spring 82, and a seat 88 which supports the pin 86.

The clearance regulating device 84 provided above the seat 88 includes: a movable regulating member 92 which extends downward by a suitable distance from the outer wall 34; a U-shaped groove 94 which receives a lower end of the movable regulating member 92 when the case 14 and the cap 20 are properly assembled together; and a guide 96 which extends outward from the groove 94 (in a leftward direction as seen in FIG. 1). The U-shaped groove 94 is defined by a portion of the downward-extending portion 32 at which the clearance regulating device 84 is to be provided, a bottom portion 90 which receives the lower end of the movable regulating member 92 when the case 14 and the cap 20 are assembled together, and a side wall 93 which extends upward from the bottom portion 90. The guide 96 extends outward from the upper end of the side wall 93 such that it is inclined somewhat upward with respect to the plane of the seal member 40.

In the air cleaner constructed according to the present invention, the hinge devices 24 and the clamping devices 26 cooperate with each other to air-tightly secure the cap 20 relative to the case 14 with the seal member 40 interposed between the first flange 28 of the case 14 and the second flange 30 of the cap 20. Thus, the case 14 and the cap 20 are assembled together to provide the air cleaner as shown in FIG. 1. Described in detail, the seal member 40 is interposed and compressed between the first and second flanges 28, 30 such that a pair of thick-walled portions of the opposite side walls of the U-shaped seal member 40 sandwich, therebetween, the outward-extending flange 44 of the seal holder 42 attached to the filter element 22. Further, a pair of seal lips 46, 46 formed on the outside of the respective opposite side walls of the U-shaped seal member 40 are held in elastic contact with the upper surface of the first flange 28 of the case 14 and the lower surface of the second flange 30 of the cap 20, as clearly shown in FIG. 4. Thus, the seal member 40 together with the seal lips 46 functions to air-tightly seal the clearance between the first flange 28 of the case 14 and the second flange 30 of the cap 20. The upper surface of the first flange 28 and the lower surface of the second flange 30 respectively serve as a sealing surface to be held in elastic contact with the respective seal lips 46 of the seal member 40. However, in this embodiment, only the lower surface of the second flange 30 will be referred to as a sealing surface 98.

In assembling the air cleaner of the present invention, the filter element 22 with the seal holder 42 supporting the seal member 40 at its outward-extending flange 44 is initially accommodated within the case 14. Then, the cap 20 is mounted on the case 14 with the seal member 40 supported on the first flange 28 of the case 14. Thereafter, the case 14 and the cap 20 are firmly secured to each other by the pair of hinge devices 24 at the right side surface of the air cleaner as seen in FIG. 1, and by the pair of clamping devices 26 at the left side surface as seen in FIG. 1.

There will be next described in detail a manner of engaging the upper component 54 of the hinge device 24 with the lower component 52 of the same 24 for fixedly securing the cap 20 to the case 14. For engagement of the upper component 54 with the lower component 52, the cap 20 is moved relative to the case 14 such that the upper component 54 of the cap 20 positioned right above the lower component 52 of the case 14 as shown in FIG. 6 is moved downward, i.e., in a direction perpendicular to the plane of the opening 12 of the case 14, as indicated by an arrow in FIG. 6. Alternatively, the cap 20 may be moved relative to the case 14 such that the upper component 54 of the cap 20 is moved in a direction parallel with the plane of the opening 12 of the case 14, as indicated by an arrow in FIG. 7. Further, the cap 20 may be moved such that the upper component 54 is displaced relative to the lower component 52 in an inclined direction which is inclined by a suitable angle with respect to the plane of the opening 12.

When the upper component 54 is moved relative to the lower component 52 in the perpendicular direction as described above, i.e., in the direction as indicated by the arrow in FIG. 6, the cap 20 is first positioned over the case 14 such that the shaft 68 of the upper component 54 can be received in the clearance defined by and between the projections 65 and the inner edges of the respective engaging portions 60 of the receptacles 55, 56. Then, the upper component 54 is moved downward in the direction indicated by the arrow in FIG. 6 so that the distal end or protruding portion 72 of the shaft 68 abuts against or engages the projections 65 as shown in FIG. 4. In this state, the cap 20 is located in a position as indicated by a two-dot chain line in FIG. 1. Described in detail, on the left side surface of the air cleaner, the movable regulating member 92 of the clamping device 26 is held at the lower end thereof in abutting contact with the guide 96. Thus, the cap 20 is supported relative to the case 14 by abutment of the movable regulating member 92 against the guide 96 on the left side surface, and by abutment of the protruding portion 72 of the shaft 68 against the guide portion 57 on the right side surface. Therefore, the cap 20 as a whole slightly floats above the case 14 and is inclined by a small angle with respect to the plane of the opening 12 of the case 14, as indicated in the two-dot chain line of FIG. 1. In this state, the sealing surface 98 of the second flange 30 on the side of the clamping devices 26 is completely kept away from the sealing member 40. On the other hand, the sealing surface 98 of the second flange 30 on the side of the hinge devices 24 is spaced away by a small distance from the sealing member 40 or held in slight contact with the sealing member 40.

Subsequently, the shaft 68 which has been held in abutment with the projections 65 as shown in FIG. 4 is moved in a rightward direction as indicated by an arrow in FIG. 4, for engagement of the end portions 70 of the shaft 68 with the respective engaging portions 60 of the receptacles 55, 56. While the shaft 68 is moved in the rightward direction as described above, the sealing surface 98 of the second flange 30 on the side of the hinge devices 24 may be brought into sliding contact with the upper seal lip 46. In this arrangement, however, the seal member 40 does not suffer from elastic deformation which might be caused by the friction force due to the sliding contact of the sealing member 40 with the sealing surface 98, since the sealing surface 98 is spaced away by a small distance from the seal member 40 or is held in merely slight contact with the seal member 40 as described above.

On the other hand, the sealing surface 98 is completely kept away from the upper seal lip 46 of the seal member 40 on the side of the clamping devices 26. Accordingly, the sealing surface 98 does not interfere with the upper seal lip 46 while the shaft 68 is moved in the rightward direction as seen in FIG. 4. Thus, the seal lip 46 is free from a possibility that it might be caught by an inner edge of the sealing surface 98 and undesirably deformed, making it impossible to assure sufficient sealing tightness between the first flange 28 of the case 14 and the second flange 30 of the cap 20. As the shaft 68 of the hinge device 24 is moved in the rightward direction for engagement of the end portions 70 with the respective engaging portions 60 of the receptacles 55, 56, the movable regulating member 92 of the clamping device 26 which has been in abutting contact with the guide 96 is moved rightward as seen in FIG. 1, and consequently, received within the groove 94 so that the cap 20 is held in position relative to the case 14 as indicated by a solid line in FIG. 1 with the sealing surface 98 of the second flange 30 held in sealing contact with the sealing member 40. In this case, since the sealing surface 98 of the second flange 30 is lowered to the sealing member 40 downward from right above of the sealing member 40, the upper seal lip 46 does not suffer from the elastic deformation which is caused by the above-described sliding contact with the sealing surface 98 and which leads to poor sealing between the case 14 and the cap 20.

While the lower end of the movable regulating member 92 is held in abutting contact with the guide 96, the shaft 68 of the upper component 54 of the hinge device 24 is supported at its distal end 72 by the guide portion 57 of the lower component 52. Subsequently, the movable regulating member 92 is received within the groove 94 and the sealing surface 98 comes into sealing contact with the seal member 40 as described above. At the same time, the shaft 68 floats above the guide portion 57, and consequently, the end portions 70 of the shaft 68 are brought into abutting contact with the respective engaging portions 60 of the receptacles 55, 56. In this state, the clearance defined by and between the first flange 28 of the case 14 and the second flange 30 of the cap 20 is kept at a predetermined value. Once the movable regulating member 92 is received within the groove 94, the cap 20 is inhibited from moving to the right and left as seen in FIG. 1, relative to the case 14. In addition, the cap 20 is inhibited from moving to the right and left as seen in FIG. 3, due to the engagement of the outer wall 34 of the cap 20 and the downward-extending portion 32 of the case 14. Thus, the present arrangement is capable of assuring a fixedly assembled structure of the air cleaner.

The assembling of the air cleaner is completed by clamping the upper end of the movable regulating member 92 by the semicircular spring 82, thus providing sealing tightness between the first flange 28 of the case 14 and the second flange 30 of the cap 20 with the seal member 40 interposed therebetween. In the thus assembled air cleaner, the clearance between the first and second flanges 28, 30 is kept constant both by the engagement of the movable regulating member 92 with the groove 94 on the side of the clamping devices 26, and the engagement of the end portions 70 of the shaft 68 with the respective engaging portions 60 of the receptacles 55, 56 on the side of the hinge devices 24. Accordingly, the contact pressure of the first and second flanges 28, 30 with respect to the seal member 40 is maintained at a predetermined suitable value in the air cleaner constructed as described above.

Next, there will be described another way of positioning the upper component 54 relative to the lower component 52 before the engagement of the two components 52, 54. That is, the cap 20 is moved relative to the case 14 such that the upper component 54 of the cap 20 is moved in a direction parallel with the plane of the opening 12, i.e., in a direction indicated by an arrow in FIG. 7, or such that the upper component 54 of the cap 20 is moved relative to the lower component 52 in an inclined direction which is inclined by a suitable angle with respect to the plane of the opening 12, i.e., in a direction down to the right as seen in FIG. 7.

Figure 8:
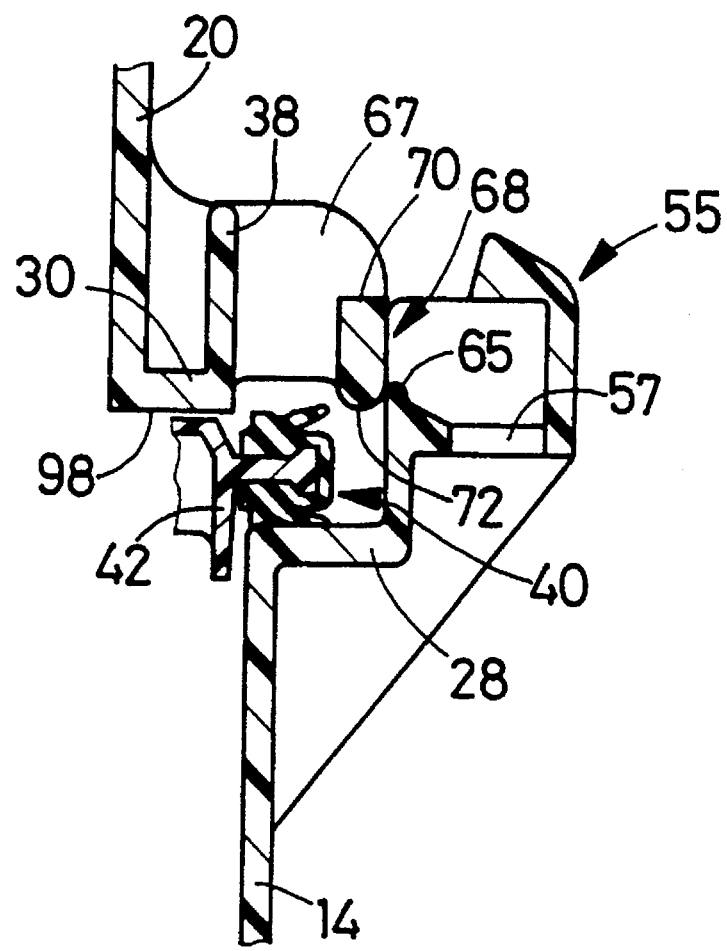
FIG. 8 is a cross sectional view of the hinge device of FIG. 4, wherein a further advancing movement of the cap 20 is prevented due to collision of the protruding portion 72 of the shaft 68 against the projection 65.
Figure 21:
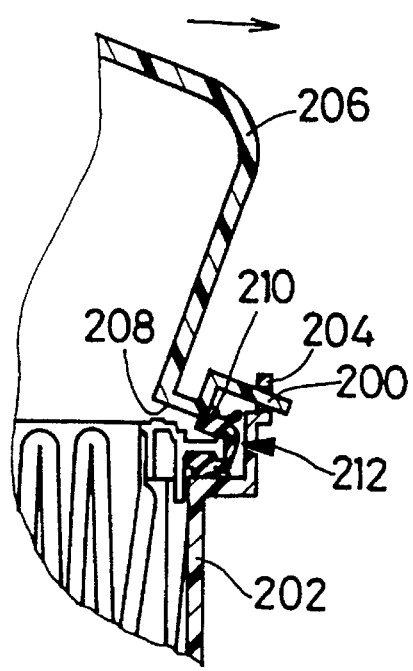
FIG. 21 is a fragmentary front elevation view in cross section of a conventional air cleaner, wherein a seal member suffers from elastic deformation upon engagement of an upper and a lower component of a hinge device, which leads to poor sealing between the cap and case of the air cleaner.

When the upper component 54 is moved relative to the lower component 52 in the parallel direction or in the inclined direction as described above for engagement of the lower and upper components 52, 54, the outer edge of the sealing surface 98 of the second flange 30 may interfere with the inner edge of the sealing member 40 on the side of the hinge devices 24 as experienced in the conventional air cleaner shown in FIG. 21, undesirably causing elastic deformation of the seal member 40 which deteriorates sealing tightness between the first flange 28 of the case 14 and the second flange 30 of the cap 20. In the present invention, however, such interference of the sealing surface 98 with the seal member 40 is effectively avoided by collision of the protruding portion 72 of the shaft 68 of the upper component 54 against the projections 65 of the lower component 52 as described in detail below with reference to FIG. 8. Accordingly, the present air cleaner does not suffer from poor sealing tightness between the first and second flanges 28, 30 which results from elastic deformation of the seal member 40. When the cap 20 is moved toward a position in which the outer edge of the sealing surface 98 is likely to interfere with the inner edge of the seal member 40, the sealing surface 98 is forced to be kept away from the seal member 40 owing to the collision of the protruding portion 72 of the shaft 68 against the projections 65 on the side of the hinge devices 24 as shown in FIG. 8, in addition to the abutment of the movable regulating member 92 against the guide 96 on the side of the clamping devices 26 as explained above. Consequently, the seal member 40 is prevented from being elastically deformed due to interference thereof with the outer edge of the sealing surface 98.

More specifically described, when the upper component 54 is moved relative to the lower component 52 in the parallel direction or in the inclined direction as described above for engagement of the lower and upper components 52, 54, it is desirable that the cap 20 be moved relative to the case 14 such that the upper component 54 of the cap 20 describes an appropriate arch, so that the protruding portion 72 of the shaft 68 does not collide against the projections 65 of the lower component 52. In case that the upper component 54 takes an improper arcuate path which will undesirably cause the interference of the outer edge of the sealing surface 98 with the inner edge of the seal member 40, the protruding portion 72 of the shaft 68 collides against the projections 65 as shown in FIG. 8, prior to the possible interference of the sealing surface 98 with the seal member 40. The collision of the protruding portion 72 against the projections 65 hinders a further advancing movement of the cap 20 in the rightward direction for engagement of the end portions 70 of the shaft 68 with the respective engaging portions 60 of the receptacles 55, 56. In the meantime, on the side of the clamping devices 26, the abutment of the movable regulating member 92 on the guide 96 keeps the second flange 30 of the cap 20 away, by a suitable distance, from the seal member 40 disposed on the upper surface of the first flange 28 of the case 14. In this respect, for assembling the air cleaner according to the present invention, the cap 20 is moved with respect to the case 14 in a manner such that the upper component 54 takes the appropriate arcuate path as described above so as to avoid the collision of the protruding portion 72 of the shaft 68 against the projections 65. In this arrangement, the upper component 54 is positioned relative to the lower component 52 as shown in FIG. 4 at an initial stage of the engagement of the two components 52, 54, wherein the protruding portion 72 of the shaft 68 is held in abutting contact with the projections 65 of the lower component 52. Thus, the seal member 40 does not suffer from elastic deformation which leads to the poor sealing tightness between the case 14 and the cap 20, since the sealing surface 98 does not interfere at its outer edge with the inner edge of the seal member 40 on the side of the hinge devices 24. The shaft 68 of the upper component 52 which is held in abutting contact with the projections 65 as shown in FIG. 4 is further advanced toward the receptacles 55, 56 for the engagement of the end portions 70 of the shaft 68 with the respective engaging portions 60 of the receptacles 55, 56, in the same manner as described above with respect to FIG. 6.

In the air cleaner constructed according to the present invention, when the filter element 22 which has been used is replaced with a new one, the cap 20 is either completely detached from the case 14, or opened by being rotated relative to the case 14.

When the cap 20 is detached from the case 14, the semicircular spring 82 of the clamping device 26 is first released so as to disengage the lower end of the movable regulating member 92 from the groove 94. On the other hand, the end portions 70 of the shaft 68 of the hinge device 24 are disengaged from the respective engaging portions 60 of the receptacles 55, 56, and accordingly, the shaft 68 is removed from the inner space defined by the pair of receptacles 55, 56, guide portion 57, and the projections 65.

When the cap 20 is opened by being rotated relative to the case 14, the cap 20 is initially rotated by a suitable amount while being supported at the sealing surface 98 of the second flange 30 thereof, by the seal member 40 on the side of the hinge devices 24. In this state, the end portions 70 of the shaft 68 are disengaged from the engaging portions 60 of the receptacles 55, 56, and the shaft 68 is supported at its distal end thereof, i.e., at the protruding portion 72, by the guide portion 57. As the cap 20 is further rotated, the shaft 68 abuts on the back walls 59 of the receptacles 55, 56. As the rotating movement of the cap 20 further progresses, the shaft 68 is moved to the left as seen in FIG. 1 with the protruding portion 72 thereof held in contact with the guide portion 57, while at the same time, the abutting position of the shaft 68 with the back walls 59 moves downward as seen in FIG. 1. Thus, the cap 20 is rotated with respect to the case 14 while the shaft 68 is rotated within the bearing portion provided by the pair of receptacles 55, 56, guide portion 57 and projections 65. While the cap 20 is rotated as described above, the cap 20 may be excessively moved to the left as seen in FIG. 1. In this arrangement, however, the protruding portion 72 as the distal end of the shaft 68 will abut on the projections 65, thereby to prevent the shaft 68 from being slipped off from the guide portion 57.

It is apparent from the above description that the shaft 68 of the upper component 54 is rotatable with stability within the bearing portion provided by the pair of receptacles 55, 56, guide portion 57 and projections 65. Thus, the hinge device 24 having the lower and upper components 52, 54 secures the case 14 and the cap 20 to each other such that the cap 20 is rotatable relative to the case 14 substantially about an axis line of the shaft 68.

The lower and upper components 52, 54 are engaged with each other as shown in FIG. 5 and disengaged from each other as shown in FIGS. 6 and 7. While the case 14 and the cap 20 are properly assembled together, the end portions 70 of the shaft 68 are held in engagement with the respective engaging portions 60 of the receptacles 55, 56, whereby the clearance or distance between the first flange 28 of the case 14 and the second flange 30 of the cap 20 is suitably kept constant in the present arrangement. The engaging portions 60 and the end portions 70 respectively correspond to a first engaging portion and a second engaging portion of the air cleaner of the present invention.

The guide 96 and the regulating member 92 of the clamping device 26 respectively correspond to a first guide surface and a first guided portion of the air cleaner of the present invention, while the guide portion 57 and the protruding portion 72 respectively correspond to a second guide surface and a second guided portion of the air cleaner of the present invention.

The protruding portion 72 of the shaft 68 is adapted to collide against the projections 65 of the lower component 52 in the case where the sealing surface 98 of the second flange 30 is likely to interfere with the inner edge of the sealing member 40. In this respect, the projection 65 and the protruding portion 72 respectively correspond to a first protruding portion and a second protruding portion of the air cleaner of the invention.

Figure 9:
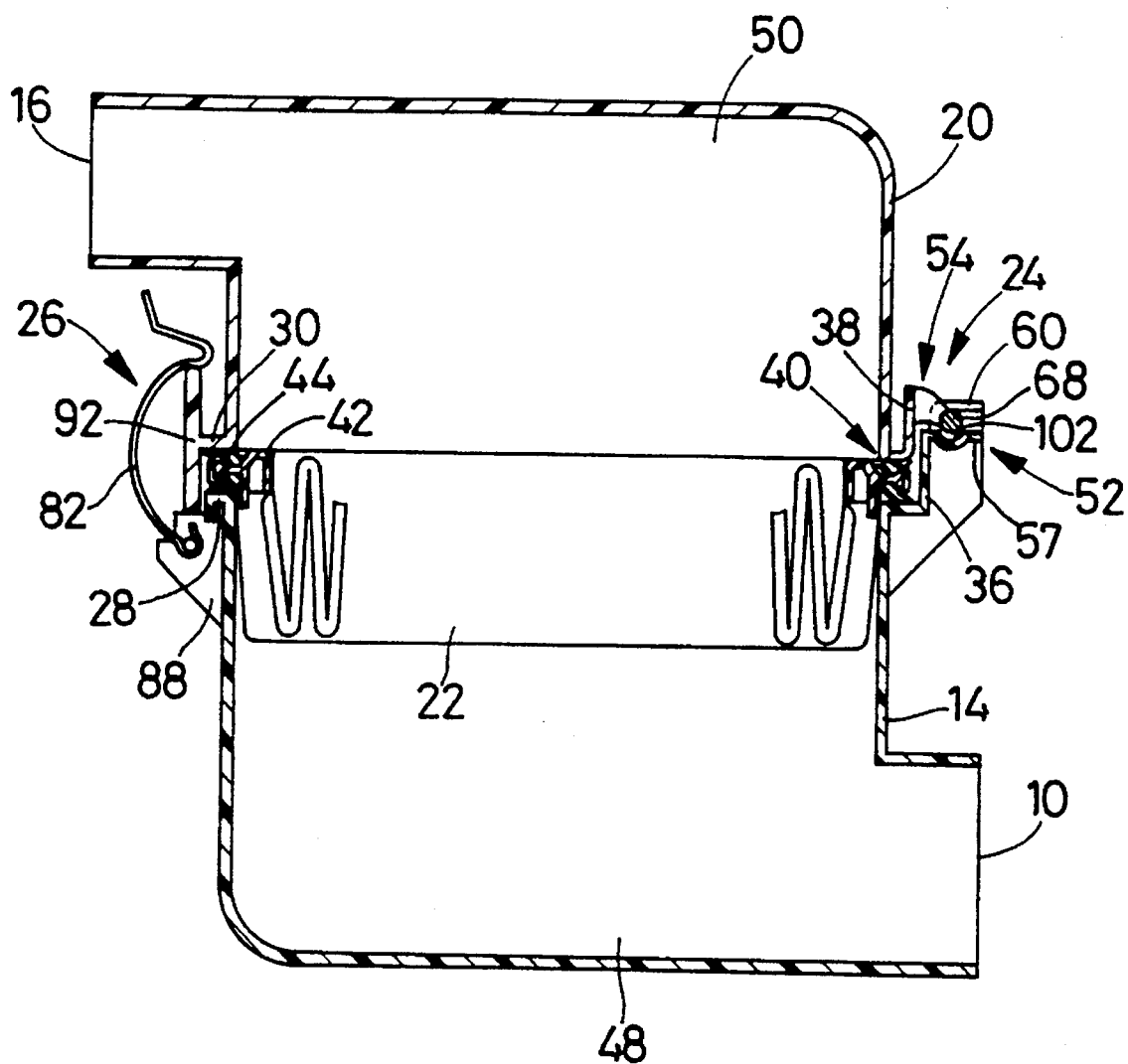
FIG. 9 is a front elevation view in cross section showing an air cleaner according to a second embodiment of the invention.
Figure 10:
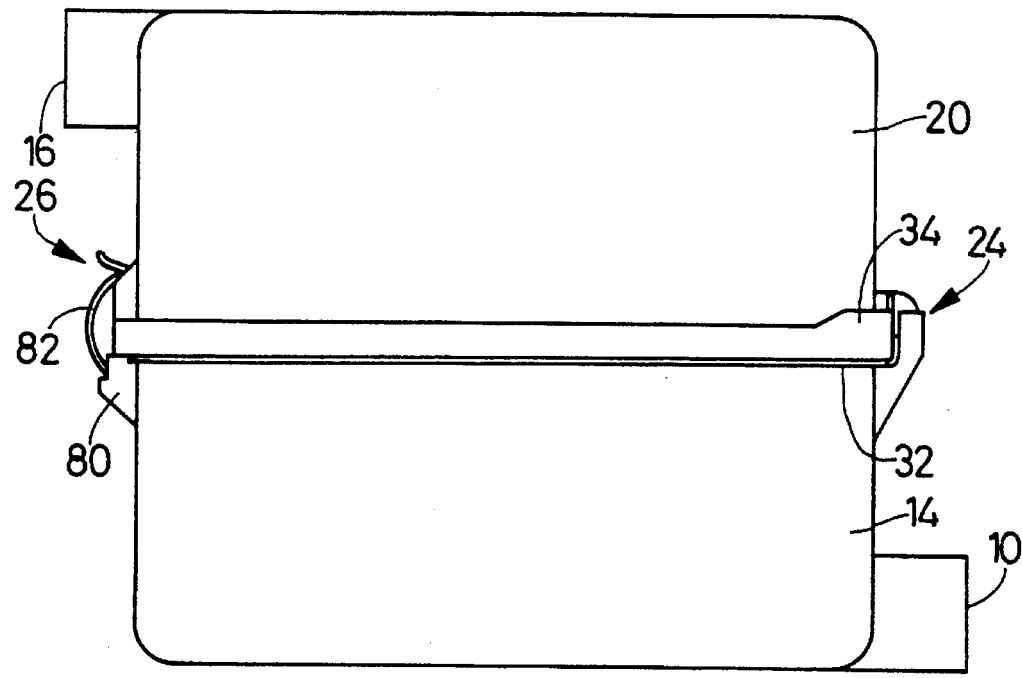
FIG. 10 is a front elevation view of the air cleaner of FIG. 9.
Figure 11:
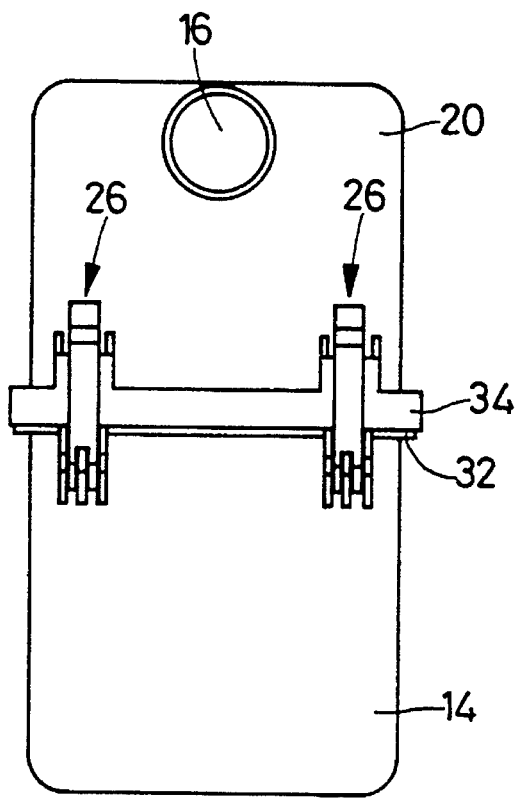
FIG. 11 is a left-hand side elevation view of the air cleaner of FIG. 9.

Referring next to FIGS. 9–11, there will be described a second embodiment of the air cleaner according to the present invention. The air cleaner of this second embodiment is identical in construction with the air cleaner of the preceding first embodiment, except for the structures of the hinge devices 24 and the clamping devices 26 which will be described below. In this respect, the same reference numerals as used in the preceding first embodiment are used to identify the corresponding components in this modified embodiment.

Figure 12:
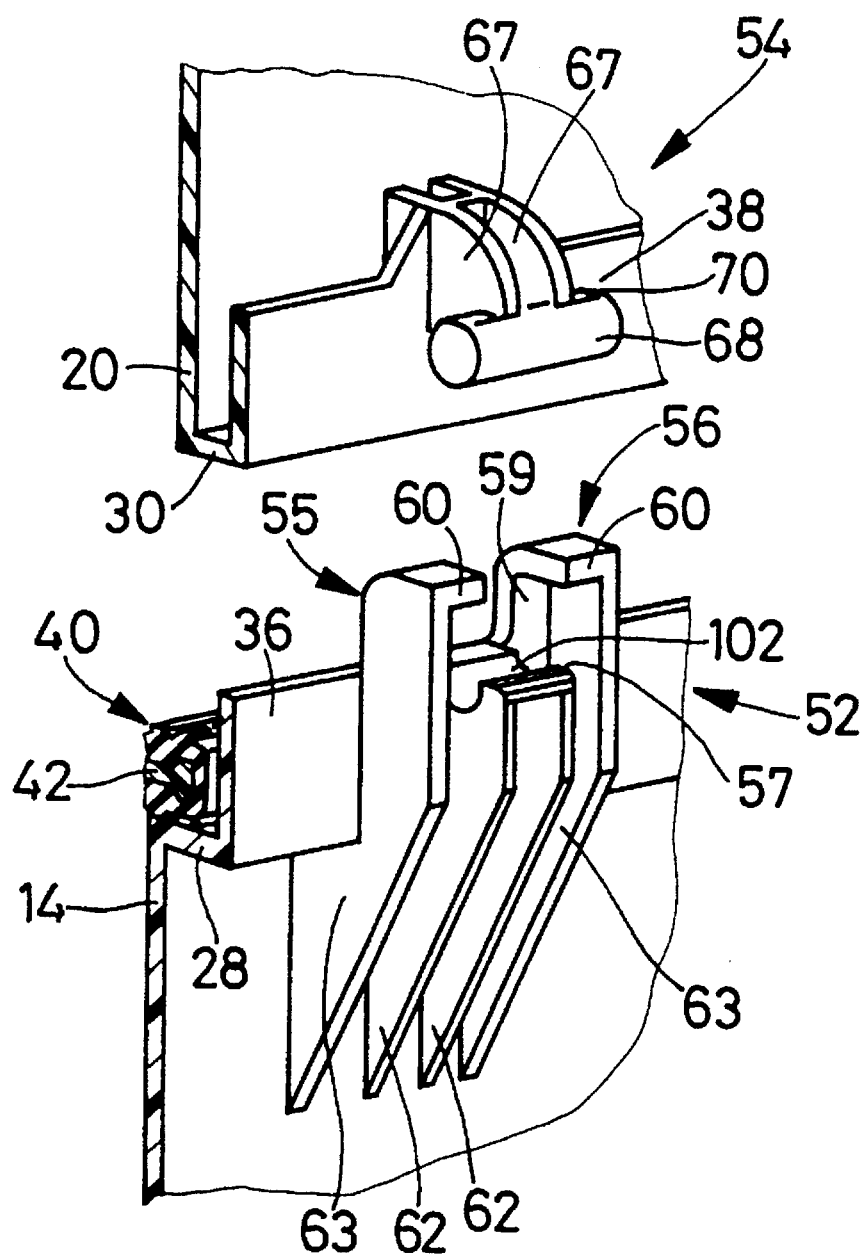
FIG. 12 is a perspective view showing an upper component and a lower component of a hinge device used in the air cleaner of FIG. 9 before they are engaged with each other.
Figure 13:
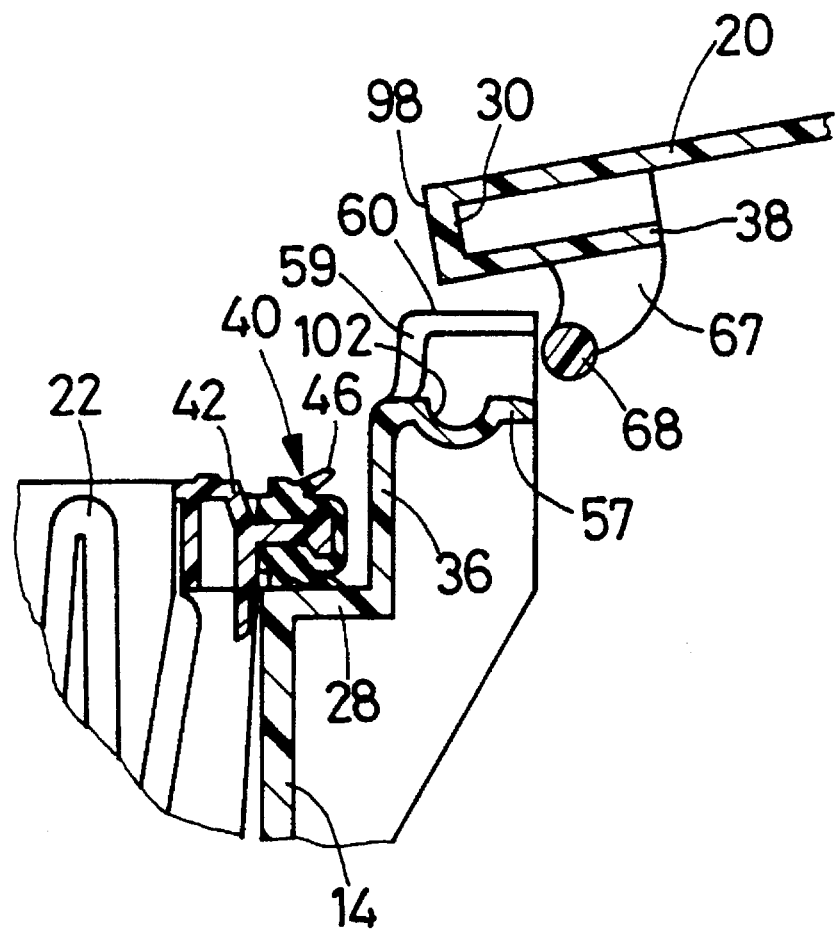
FIG. 13 is a cross sectional view of the upper and lower components of the hinge device of FIG. 12 which shows an initial stage of engagement of the upper component with the lower component.

In each hinge device 24 of this second embodiment, the lower component 52 has a pair of outwardly-oriented receptacles 55, 56 as shown in FIG. 12 each of which includes: a back wall 59 which extends upward by a suitable amount from the top end of the outer wall 36 as shown in FIG. 13; engaging portions 60 which define the top end of the back wall 59 and extend in the outward direction of the case 14 (in the rightward direction as seen in FIG. 13); and a guide portion 57 having an arcuate bearing groove 102 which is adapted to receive a columnar shaft 68 of the upper component 54 as shown in FIG. 12. The lower component 52 in this second embodiment does not have protrusions (65) on portions of the outer wall 36 corresponding to the pair of receptacles 55, 56, unlike the lower component 52 of the preceding first embodiment. On the other hand, each clamping device 26 of this embodiment does not have a groove (94) for receiving the lower end of the movable regulating member 92, or a guide (96) on which the lower end of the regulating member 92 abuts, unlike the clamping devices 26 of the preceding first embodiment.

In the present hinge device 24, a clearance defined by and between the plane of the upward-extending portion 38 and the columnar shaft 68 is made smaller than a thickness dimension of the pair of receptacles 55, 56. Accordingly, in the present embodiment, it is impossible to engage the end portions 70 of the shaft 68 with the respective engaging portions 60 of the receptacles 55, 56 by first positioning the upper component 54 of the cap 20 right above the lower component 52 of the case 14, and then moving the upper component 54 in the downward direction which is perpendicular to the plane of the opening 12 of the case 14, as effected in the preceding first embodiment shown in FIG. 6. Therefore, in this embodiment, for the engagement of the end portions 70 of the shaft 68 with the engaging portions 60 of the receptacles 55, 56, the upper component 54 of the cap 20 is moved relative to the lower component 52 of the case 14 in a direction from the right to the left as seen in FIG. 12. That is, the shaft 68 is inserted into an inner space defined by the receptacles 55, 56 and the guide portion 57, in the inward direction with respect to the case 14.

Moreover, when the shaft 68 is inserted into the receptacles 55, 56, the cap 20 needs be rotated by a certain angle relative to the case 14 as shown in FIG. 13, for inhibiting the second flange 30 of the cap 20 from interfering with the pair of receptacles 55, 56. In this arrangement, the outer edge of the sealing surface 98 of the second flange 30 does not interfere with the seal member 40 supported on the first flange 28, and therefore, the seal member 40 is completely free from elastic deformation which would be caused due to interference thereof with the sealing surface 98.

If the cap 20 is moved to the left as seen in FIG. 9 for the engagement of the shaft 68 with the receptacles 55, 56, with the sealing surface 98 of the second flange 30 held in contact with the seal lip 46 of the seal member 40, the seal lip 46 would be folded back and undesirably deformed due to the interference with the sealing surface 98, resulting in poor sealing between the case 14 and the cap 20. However, in the present arrangement wherein the clearance defined by the shaft 68 and the plane of the upward-extending portion 38 is made smaller than the thickness dimension of the receptacles 55, 56, the shaft 68 cannot be engaged with the receptacles 55, 56 in the same manner as described with reference to FIG. 6, and therefore, the present arrangement does not suffer from such elastic deformation of the seal lip 46 due to the interference thereof with the sealing surface 98.

It is noted that the receptacles 55, 56 correspond to a first interfering portion while the second flange 30 of the cap 20 and portions of the cap 20 adjacent to the second flange 30 correspond to a second interfering portion of the air cleaner of the present invention.

Figure 14:
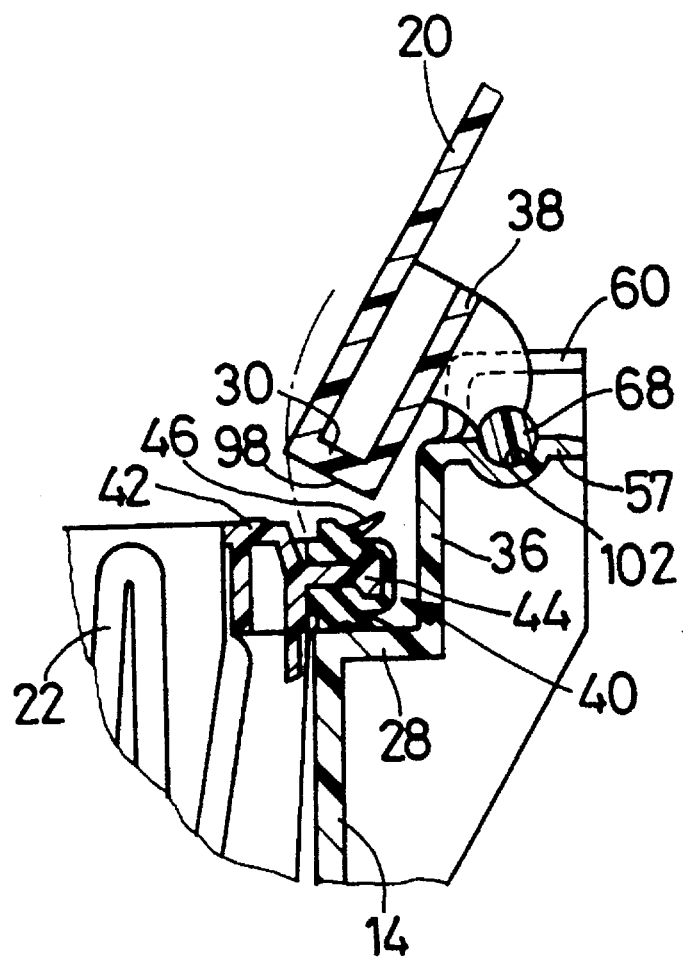
FIG. 14 is a cross sectional view of the upper and lower components of the hinge device of FIG. 12 which shows a subsequent stage of engagement of the two components.

After the cap 20 is rotated by a certain angle relative to the case 14 as shown in FIG. 13 wherein the first flange 30 of the upper component 54 is kept away from the receptacles 55, 56, the shaft 68 is inserted into the inner space of the receptacles 55, 56 from the right to the left as seen in FIG. 13, i.e., in the inward direction with respect to the case 14, until the shaft 68 abuts against the back walls 59 of the receptacles 55, 56. When the cap 20 is moved downward, the shaft 68 is received within the arcuate bearing groove 102 and rotatably supported by the bearing groove 102 as shown in FIG. 14. Thus, the cap 20 is rotatable about an axis line of the shaft 68.

As apparent from FIG. 14, the above-described axis line of the shaft 68 around which the cap 20 is rotatable is located above the seal lip 46 of the seal member 40. As a result of the rotating movement of the cap 20 about the axis line of the shaft 68, the sealing surface 98 of the second flange 30 abuts on the seal member 40 such that the outer edge of the sealing surface 98 presses on the seal lip 46 so that the seal member 40 is tightly interposed by and between the sealing surface 98 of the second flange 30 and the upper surface of the first flange 28. Accordingly, the case 14 and the cap 20 are assembled together with sufficient sealing tightness therebetween.

Figure 15:
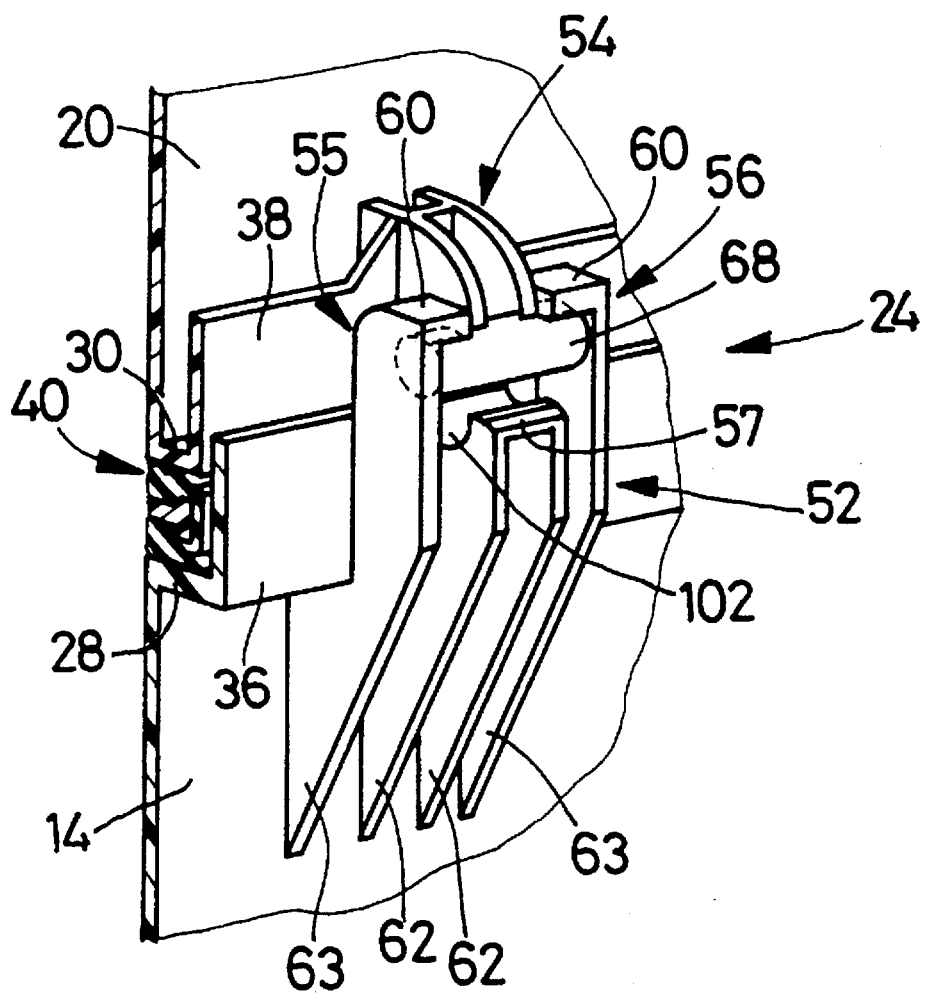
FIG. 15 is a perspective view showing the upper and lower components of the hinge device of FIG. 12 which are engaged with each other.

After the sealing surface 98 of the second flange 30 is brought into abutment on the seal member 40 as described above, the cap 20 is moved such that the shaft 68 which has been received within the arcuate bearing groove 102 comes out of the groove 102, until the end portions 70 of the shaft 68 engage the respective engaging portions 60 of the pair of receptacles 55, 56 as shown in FIG. 15.

Thus, the cap 20 is properly secured relative to the case 14 on the right side surface as seen in FIG. 9 by the engagement of the lower and upper components 52, 54 of each hinge device 24. On the left side surface as seen in FIG. 9, the case 14 and the cap 20 are clamped by the clamping devices 26. Therefore, the cap 20 and the case 14 are assembled together with the seal member 40 tightly interposed between the first flange 28 of the case 14 and the second flange 30 of the cap 20. In each clamping device 26 of the present embodiment wherein neither the guide 96 nor the U-shaped groove 94 is provided unlike the hinge devices 26 of the preceding first embodiment, the clearance between the first flange 28 of the case 14 and the second flange 30 of the cap 20 is suitably determined by abutment of the lower end of the movable regulating member 92 against the upper surface of the seat 88 as shown in FIG. 9.

While the present invention has been described in its presently preferred embodiments by reference to FIGS. 1 through 15, it is to be understood that the invention may be otherwise embodied.

Figure 16:
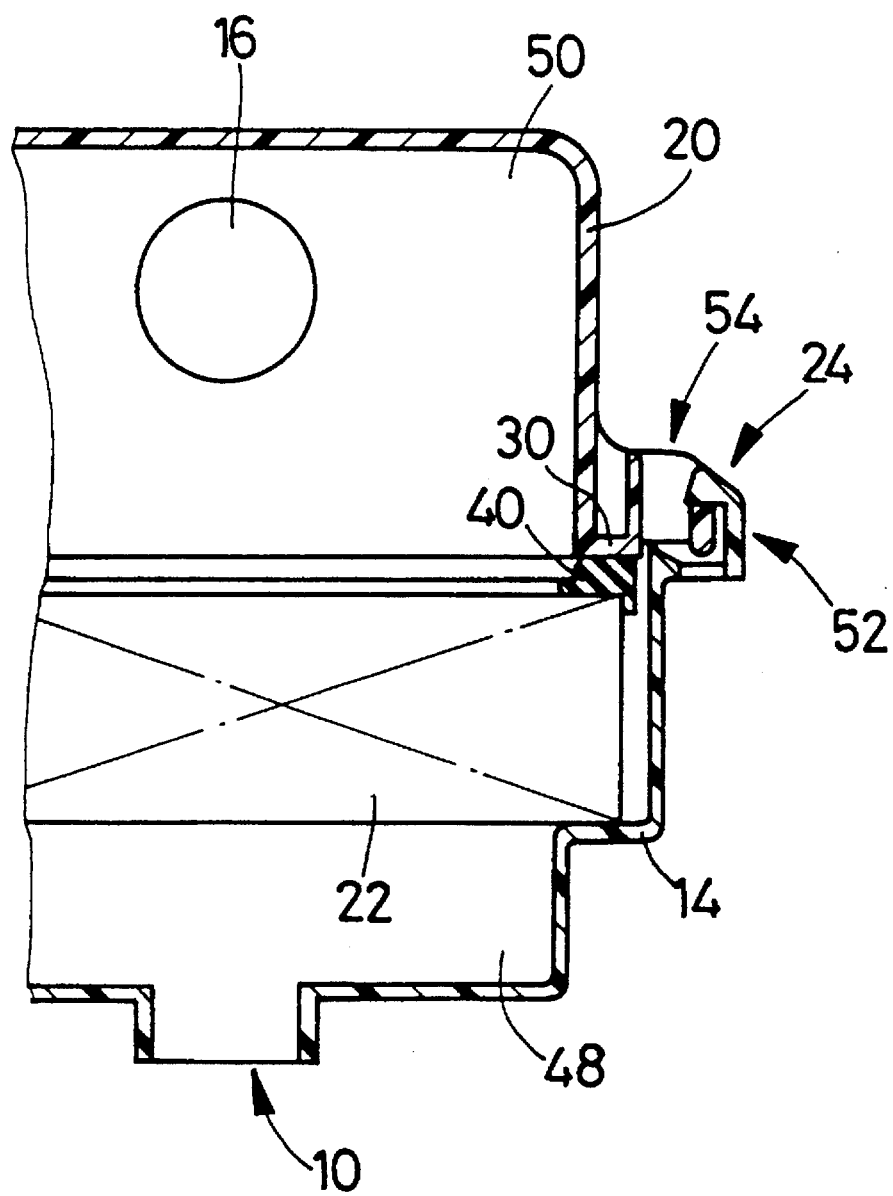
FIG. 16 is a fragmentary front elevation view in cross section showing a modified form of the air cleaner of FIG. 1.

In the illustrated embodiments, the seal member 40 is interposed between the first flange 28 of the case 14 and the second flange 30 of the cap 20 for air-tightly sealing the interface between the case 14 and the cap 20. However, the seal member 40 may be interposed between the second flange 30 of the cap 20 and the outer periphery of the filter element 22, and accordingly, the seal member 40 may be held in sealing contact only with the second flange 30. In this case, the filter element 22 is supported within the case 14 by abutment of the outer periphery of the bottom portion thereof with the case 14 as shown in FIG. 16.

In the illustrated embodiments, the two hinge devices 24 are provided on one of the opposite side surfaces of the air cleaner (the right side surface as seen in FIGS. 1 and 9) while the two clamping devices 26 are provided on the other side surface (the left side surface as seen in FIGS. 1 and 9). However, the numbers and positions of these devices are not limited to those of the illustrated embodiments. For instance, only one clamping device 26 may be provided on the left side surface while two hinge devices 24 on the right side surface. Further, the hinge device 24 and the clamping device 26 are not necessarily provided on the side surfaces of the air cleaner in opposed relation to each other. For instance, the clamping device 26 may be provided on a front or rear surface of the air cleaner while the hinge device 24 is provided on one of the opposite side surfaces.

While in the illustrated embodiments, the cap 20 is fixedly secured relative to the case 14 on the left side surface by the clamping device 26 wherein the spring action of the semi-circular spring 82 are utilized, the case 14 and the cap 20 may be clamped together by using bolts and nuts or other clamping members.

Figure 17:
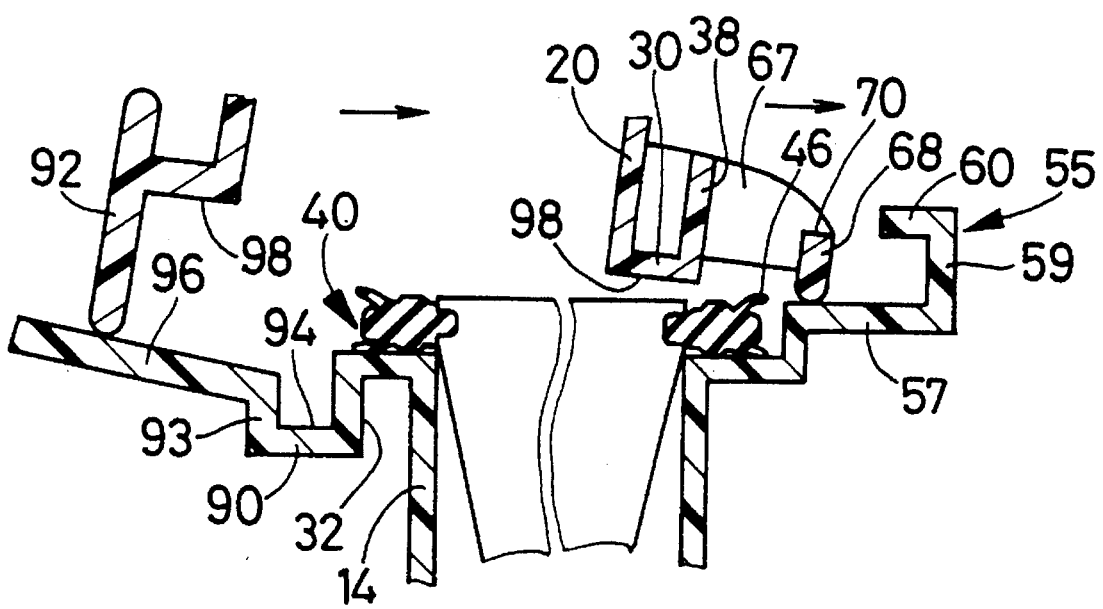
FIG. 17 is a front elevation view in cross section illustrating principal parts of an air cleaner according to a third embodiment of the invention.

In the illustrated first embodiment, the seal member 40 is effectively prevented from elastic deformation which results from the interference thereof with the second flange 30 of the cap 20, both by the provision of the projection 65 and the protruding portion 72 of the shaft 68 which collides with each other when the second flange 30 is likely to interfere with the seal member 40, and by the provision of the movable regulating member 92 and the guide 96 which are kept in abutment with each other for keeping the second flange 30 away from the seal member 40 until the shaft 68 engages the engaging portions 60 of the receptacles 55, 56 at a prescribed engaging position in the receptacles 55, 56. However, the present invention may be practiced as shown in a third embodiment of FIG. 17, wherein the projection 65 is not provided in the lower component 52, unlike the first embodiment. In this modified third embodiment, the movable regulating member 92 has a suitably predetermined length dimension so as to assure that the outer edge of the sealing surface 98 on the side of the hinge devices 24 does not interfere with the inner edge of the seal member 40 as long as the movable regulating member 92 is held in abutment with the guide 96 and while the shaft 68 is held in abutment with the guide portion 57 as shown in FIG. 17. Thus, also in this third embodiment, the seal member 40 is free from elastic deformation which leads to poor sealing tightness between the case 14 and the cap 20.

In the illustrated first embodiment, for engaging the end portions 70 of the shaft 68 with the respective engaging portions 60 of the receptacles 55, 56, the cap 20 is moved in the outward direction with respect to the case 14 (i.e., from the left to the right as seen in FIG. 1) while the protruding portion 72 of the shaft 68 is guided by the guide portion 57. However, the cap 20 may be moved in the reverse direction, namely, in the inward direction with respect to the case 14 (i.e., from the right to the left as seen in FIG. 1), as shown in a fourth embodiment of FIG. 18.

This modified fourth embodiment has a guide 106 which extends upward from the seal holder 42 attached to the filter element 22, for guiding the sealing surface 98 of the second flange 30 on the side of the clamping devices 26. For engaging the end portions 70 of the shaft 68 with the engaging portions 60 of the receptacles 55, 56, the shaft 68 is moved from the right to the left as seen in FIG. 18, as in the second embodiment of FIGS. 9–15.

The guide 106 and the sealing surface 98 correspond to a first and a second guide portions of the air cleaner of the present invention, while the guide portion 57 and the shaft 68 correspond to a third and a fourth guide portion of the air cleaner of the present invention.

Figure 18:
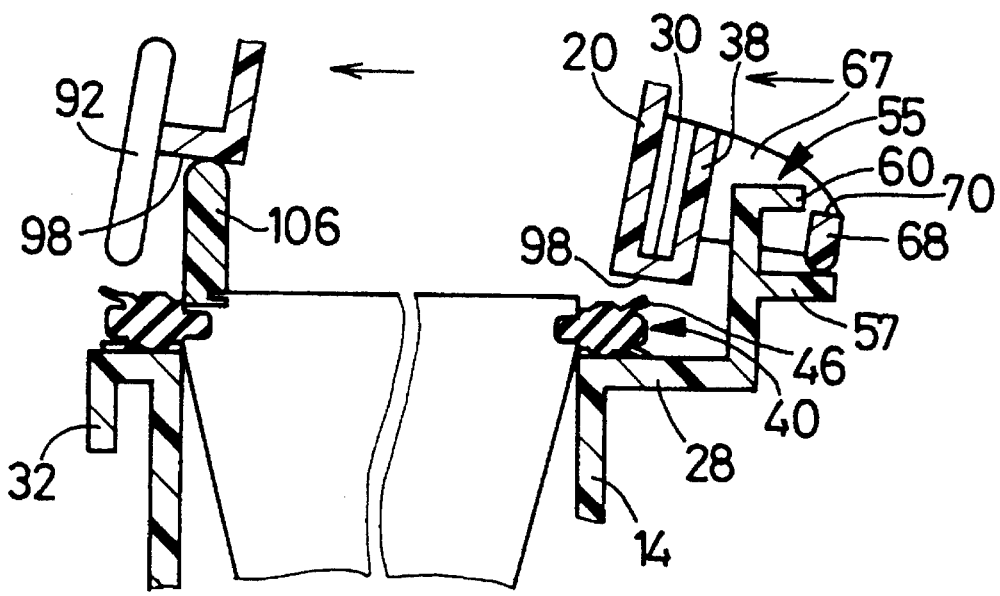
FIG. 18 is a front elevation view in cross section illustrating principal parts of an air cleaner according to a fourth embodiment of the invention.

In this arrangement, while the cap 20 is moved to the left as indicated by an arrow in FIG. 18 for the engagement of the shaft 68 with the receptacles 55, 56, the sealing surface 98 is kept away from the seal member 40 so as not to interfere with each other. At the same time when the shaft 68 engages the receptacles 55, 56, the sealing surface 98 which has been held in abutting contact with the guide 106 is disengaged therefrom, allowing the sealing surface 98 to come into contact with the seal member 40.

This embodiment is free from poor sealing between the case 14 and the cap 20 which results from elastic deformation of the seal lip 46 due to interference of the inner edge of the sealing surface 98 with the seal lip 46 on the side of the hinge devices 24, since the inner edge of the sealing surface 98 is kept away from the seal member 40 while the shaft 68 is moved to the left as seen in FIG. 18 for engagement with the engaging portions 60 of the receptacles 55, 56.

Figure 19:
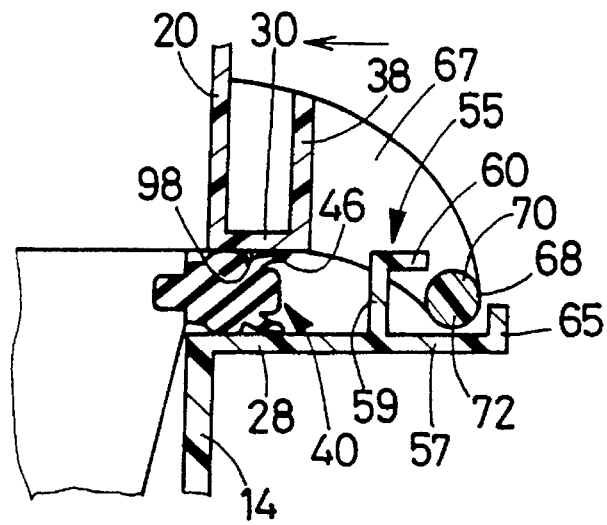
FIG. 19 is a cross sectional view of an upper component and a lower component of a hinge device used in an air cleaner according to a fifth embodiment of the invention.

Referring next to FIG. 19, there is shown a fifth embodiment of the present invention which is a modified form of the second embodiment, wherein the hinge device 24 having the outwardly-oriented receptacles 55, 56 is provided with a projection 65. In this arrangement, the lower end of the shaft 68 functions like the protruding portion 72 shown in FIG. 4 which cooperates with the projection 65 to prevent the inner edge of the sealing surface 98 from interfering with the seal lip 46 of the seal member 40 while the cap 20 is moved in the inward direction with respect to the case 14, i.e., in the leftward direction as seen in FIG. 19, for engagement of the end portions 70 of the shaft 68 with the engaging portions 60 of the receptacles 55, 56.

When the inner edge of the sealing surface 98 is about to interfere with the seal lip 46 while the cap 20 is moved to the left for inserting the shaft 68 into an inner space defined by the receptacles 55, 56, guide portion 57 and projections 65, the lower end or protruding portion 72 of the shaft 68 collides with the projection 65 prior to interference of the sealing surface 98 and the seal lip 46, and inhibits further advancing movement of the cap 20 to the left as seen in FIG. 19. Accordingly, the interference of the sealing surface 98 with the seal lip 46 is favorably avoided in this arrangement as long as the shaft 68 is moved such that the protruding portion 72 thereof does not interfere with the projection 65.

The projection 65 functions as a detention or stopper for preventing the shaft 68 from coming out of the guide 57 when the shaft 68 is rotated within the bearing portion for opening the cap 20.

Figure 20A:
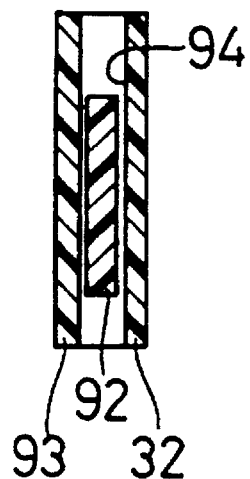
FIG. 20(A) is a cross-sectional view of the clamp device of the air cleaner of FIG. 1.
Figure 20B:
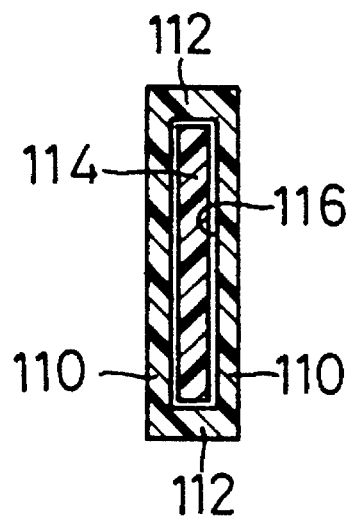
FIG. 20(B) is a cross-sectional view of a clamp device of an air cleaner as a sixth embodiment of the invention.

FIG. 20(A) shows a cross section of the downward-extending portion 32 and outer wall 93 of the case 14 as the first housing of the air cleaner of FIG. 1, and of the regulating member 92 of the cap 20 as the second housing of the air cleaner. The groove 94 is defined by the two walls 32, 93 in the right and left directions as seen in this figure, but is not defined by any walls in the upward and downward directions. However, since the outer wall 34 of the cap 20 fits over the downward-extending portion 32 of the case 14, the regulating member 92 is made immovable also in the upward and downward directions, when the regulating member 92 is engaged with the groove 94, i.e., when the case 14 and the cap 20 are assembled together. FIG. 20(B) shows a cross section of a clamp device of another air cleaner as a sixth embodiment of the present invention. This air cleaner does not have an outer wall corresponding to the wall 34 of the cap 20 shown in FIG. 1. However, the clamp device has a groove 116 corresponding to the groove 94 of the clamp device 26 shown in FIG. 1. The groove 116 is defined by a first pair of opposed walls 110, 110 and a second pair of opposed walls 112, 112. When a regulating member 114 corresponding to the member 92 shown in FIG. 20(A) is engaged with the groove 116, the regulating member 114 is kept immovable not only in the right and left directions but also in the upward and downward directions. Thus, the case 14 and the cap 20 are kept immovable relative to each other in any direction parallel to the plane in which the sealing member 40 extends in the air cleaner.

It is to be understood that the present invention may be embodied with other changes, modifications, and improvements that may occur to those skilled in the art without departing from the spirit and scope of the invention as defined in the following claims.

What is claimed is:

1. An air cleaner for cleaning air flowing through an air passage, comprising:

a separable housing including a first and a second housing for communicating with an upstream and a downstream portion of the air passage, respectively, said first and second housings having a first and a second opening, respectively;

a filter element accommodated in said separable housing;

one of said first and second housings having a sealing surface surrounding a corresponding one of said first and second openings;

a sealing member for sealing contact with said sealing surface;

a hinge device located outwardly of said first and second openings of said first and second housings, for rotatably connecting the first and second housings to each other, said hinge device including a receiving member having a receiving opening, and an axis member for being received in said receiving member through said receiving opening, said axis member and said receiving member being displaceable relative to each other substantially along a plane in which said sealing member extends;

a clamp device cooperating with said hinge device to secure said first and second housings to each other; and a protector including a first and a second abutting portion, said protector allowing said sealing surface and said sealing member to be brought into said sealing contact with each other when said axis member of said hinge device is positioned at a prescribed hinging position in said receiving member of the hinge device, and inhibiting the sealing surface and the sealing member from being brought into the sealing contact with each other, by abutment of said first and second abutting portions thereof, when the axis member is not positioned at said hinging position, said protector including, as said first and second abutting portions thereof, a portion of said first housing and a portion of said second housing, respectively.

2. An air cleaner according to claim 1, wherein said protector includes, as one of said first and second abutting portions thereof, a first guide surface located outwardly of said first and second openings of said first and second housings and remote from said hinge device, said first guide surface extending along a portion of an outer periphery of one of the first and second openings, said protector including, as the other of said first and second abutting portions thereof, a first guided portion which is abutable, and displaceable, on said first guide surface.

3. An air cleaner according to claim 2, wherein said protector includes, as said one of said first and second abutting portions thereof, a first stepped portion located outwardly of said first and second openings of said first and second housings, said first guide surface extending adjacent to said first stepped portion, said protector allowing said sealing surface and said sealing member to be brought into said sealing contact with each other when said first guided portion is removed from said first guide surface at said first stepped portion adjacent to the first guide surface.

4. An air cleaner according to claim 3, wherein said first stepped portion comprises a pair of first opposed walls defining an engaging recess, said first guided portion being engageable with said engaging recess after being removed from said first guide surface so that said first walls inhibit the first guided portion from being displaced in a first direction substantially parallel to said plane in which said sealing member extends.

5. An air cleaner according to claim 4, wherein said first stepped portion comprises a pair of second opposed walls cooperating with said first walls to define said engaging recess, said first guided portion being engageable with said engaging recess after being removed from said first guide surface so that said second walls inhibit the first guided portion from being displaced in a second direction parallel to said plane in which said sealing member extends and different from said first direction, so that said axis member of said hinge device is positioned at said hinging position, and so that said first and second housings are held in position relative to each other.

6. An air cleaner according to claim 3, wherein said protector includes, as said one of said first and second abutting portions thereof, a protrusion providing a second stepped portion, said protrusion being located outwardly of said first and second openings of said first and second housings and adjacent to said hinge device, said protector including a second guided portion as said other of said first and second abutting portions thereof, said protector including said second stepped portion and said second guided portion allowing said sealing surface and said sealing member to be brought into said sealing contact with each other when said first guided portion is removed from said first guide surface at said first stepped portion adjacent to the first guide surface.

7. An air cleaner according to claim 6, wherein said second stepped portion and said second guided portion have a first and a second shape, respectively, which allow said sealing surface and said sealing member to approach each other when said axis member of said hinge device is positioned in proximity to said hinging position and accordingly said first and second housings are placed nearly in position relative to each other.

8. An air cleaner according to claim 6, wherein said protector includes, as said one of said first and second abutting portions thereof, a second guide surface located outwardly of said first and second openings of said first and second housings and adjacent to said hinge device, said second guide surface extending along a portion of an outer periphery of one of the first and second openings, said second guided portion being abutable, and displaceable, on said second guide surface.

9. An air cleaner according to claim 8, wherein said protector includes said first guided portion which is abutable and displaceable on said first guide surface and removable from the first guide surface at said first stepped portion when said second stepped portion and said second guided portion allow said sealing surface and said sealing member to approach each other.

10. An air cleaner according to claim 9, wherein said sealing member includes a sealing lip protruding in a direction from inside, toward outside, of said separable housing, said direction having an angle with respect to said plane in which said sealing member extends, said sealing lip providing said sealing contact with said sealing surface.

11. An air cleaner according to claim 1, wherein said hinge device includes said receiving member having said receiving opening which allows said axis member of the hinge device to be received in the receiving member therethrough only when said first and second housings are placed at an angular position relative to each other, remote by more than a prescribed angular amount from a reference angular position at which the first and second housings are held in position relative to each other, said sealing member having a second sealing surface for said sealing contact with said sealing surface as a first sealing surface of said one of said first and second housings, an axis line of rotation of the axis member positioned at said hinging position in the receiving member being located on one of both sides of said second sealing surface which side is opposite to the other of said both sides on which side the sealing member is located, a portion of said first sealing surface near to the hinge device being brought into contact with said second sealing surface, in a first direction from inside, toward outside, of said separable housing, as the first and second housings are rotated relative to each other toward said reference angular position about the axis member of the hinge device.

12. An air cleaner according to claim 11, wherein said sealing member includes a sealing lip protruding in a second direction from inside, toward outside, of said separable housing, said second direction having an angle with respect to said plane in which said sealing member extends, said sealing lip providing said sealing contact with said sealing surface.

13. An air cleaner according to claim 1, wherein said protector includes, as one of said first and second abutting portions thereof, a protrusion providing a stepped portion, said protrusion being located outwardly of said first and second openings of said first and second housings and adjacent to said hinge device, said protector including a guided portion as the other of said first and second abutting portions thereof, said protector including said stepped portion and said guided portion allowing said sealing surface and said sealing member to be brought into said sealing contact with each other.

14. An air cleaner according to claim 13, wherein said stepped portion and said guided portion have a first and a second shape, respectively, which allow said sealing surface and said sealing member to approach each other when said axis member of said hinge device is positioned in proximity to said hinging position and accordingly said first and second housings are placed nearly in position relative to each other.

15. An air cleaner according to claim 1, wherein said protector includes, as one of said first and second abutting portions thereof, a guide surface located outwardly of said first and second openings of said first and second housings and adjacent to said hinge device, said guide surface extending along a portion of an outer periphery of one of the first and second openings, a guided portion being abutable, and displaceable, on said guide surface.

16. An air cleaner according to claim 1, wherein said first housing comprises a case member for accommodating said filter element and said sealing member provided along an outer periphery of the filter element, and wherein said second housing comprises a cap member covering said case member.

17. An air cleaner according to claim 1, wherein said sealing member includes a sealing lip protruding in a direction from inside, toward outside, of said separable housing, said direction having an angle with respect to said plane in which said sealing member extends, said sealing lip providing said sealing contact with said sealing surface.

18. An air cleaner according to claim 1, wherein said protector includes, as said first and second abutting portions thereof, a first guide portion and a second guide portion each adjacent to said hinge device, respectively, and additionally includes, as said first and second abutting portions thereof, a third guide portion and a fourth guide portion each remote from the hinge device toward to said clamp device, respectively, said first, second, third, and fourth guide portions having a first, a second, a third, and a fourth shape, respectively, which allow said axis member of the hinge device to be displaced relative to said receiving member of the hinge device toward said hinging position in the receiving member while inhibiting said sealing surface from interfering with said sealing member, elastically deforming the sealing member, and making said sealing contact unsatisfactory, and to allow the sealing surface and the sealing member to be brought into the sealing contact with each other when the axis member is positioned at the hinging position.

19. An air cleaner according to claim 1, wherein said protector includes, as said first and second abutting portions thereof, a first interfering portion and a second interfering portion, respectively, said first and second interfering portions interfering with each other to inhibit said axis member of said hinge device from being positioned at said hinging position in said receiving member of the hinge device, when said first and second housings are placed relative to each other within an angular-position range whose first limit corresponds to a first angular position at which said sealing surface and said sealing member are held in said sealing contact with each other and whose second limit corresponds to a second angular position at which the sealing surface and the sealing member are separated from each other, said first and second interfering portions allowing the sealing surface and the sealing member to be brought into the sealing contact with each other when the axis member is positioned at the hinging position.

20. An air cleaner according to claim 1, wherein said protector includes, as said first and second abutting portions thereof, a first protrusion and a second protrusion each adjacent to said hinge device, respectively, said first protrusion extending in a direction substantially perpendicular to a plane of said first opening of said first housing, said second protrusion extending in a direction substantially perpendicular to a plane of said second opening of said second housing, said first and second protrusions abutting on each other to inhibit said sealing surface and said sealing member from being brought into said sealing contact with each other when said axis member of the hinge device is displaced relative to said receiving member of the hinge device toward said hinging position in the receiving position, said first and second protrusions allowing the sealing surface and the sealing member to be brought into the sealing contact with each other when the axis member is positioned at the hinging position.

* * * * *